[](#)

United States Patent
Pan et al.

(10) Patent No.: US 12,252,137 B2
(45) Date of Patent: Mar. 18, 2025

(54) VEHICLE POSITIONING METHOD, APPARATUS, AND CONTROLLER, INTELLIGENT VEHICLE, AND SYSTEM

(71) Applicant: HUAWEI TECHNOLOGIES CO., LTD., Guangdong (CN)

(72) Inventors: Yangjie Pan, Shenzhen (CN); Weilong Hu, Shenzhen (CN); Xupeng Li, Shenzhen (CN); Tao Ding, Hangzhou (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 307 days.

(21) Appl. No.: 17/864,998

(22) Filed: Jul. 14, 2022

(65) Prior Publication Data

US 2022/0371602 A1    Nov. 24, 2022

Related U.S. Application Data

(63) Continuation of application No. PCT/CN2020/125761, filed on Nov. 2, 2020.

(30) Foreign Application Priority Data

Jan. 14, 2020   (CN) .......................... 202010038272.6
Mar. 13, 2020   (CN) .......................... 202010177804.4

(51) Int. Cl.
*B60W 40/10*   (2012.01)
*G06F 18/25*   (2023.01)

(52) U.S. Cl.
CPC ............. *B60W 40/10* (2013.01); *G06F 18/25* (2023.01); *B60W 2420/403* (2013.01);
(Continued)

(58) Field of Classification Search
CPC .......... B60W 40/10; B60W 2420/403; B60W 2420/408; B60W 2554/4041;
(Continued)

(56) References Cited

U.S. PATENT DOCUMENTS

2007/0208507 A1   9/2007  Gotoh
2017/0094245 A1   3/2017  Barakat et al.
(Continued)

FOREIGN PATENT DOCUMENTS

CN   103366593 A   10/2013
CN   103983997 A    8/2014
(Continued)

OTHER PUBLICATIONS

Zhu, "Research of Three Dimensional Craniofacial Point Correspondence," Thesis for the degree of Master in Software Engineering, Northwestern University, Jun. 2017, 82 pages (with English abstract and partial machine English translation).
(Continued)

*Primary Examiner* — Michael V Kerrigan
(74) *Attorney, Agent, or Firm* — Fish & Richardson P.C.

(57) ABSTRACT

The present disclosure relates to vehicle positioning methods, apparatus, controllers, intelligent vehicles, and systems. One example vehicle positioning method includes obtaining a first relative pose between a first vehicle and a help providing object, obtaining a global pose of the help providing object, and calculating a global pose of the first vehicle based on the first relative pose and the global pose.

20 Claims, 6 Drawing Sheets

(52) U.S. Cl.
CPC .............. *B60W 2420/408* (2024.01); *B60W 2554/4041* (2020.02); *B60W 2554/4049* (2020.02)

(58) Field of Classification Search
CPC ............ B60W 2554/4049; G06F 18/25; G01S 7/4808; G01S 17/86; G01S 17/87; G01S 17/931; G01S 5/163; G01S 13/931; G01S 17/42; G01S 19/53; G01S 13/865; G01S 13/867; G01S 17/875; G01C 21/26; G01C 21/165; G06V 20/58; G06V 20/64
See application file for complete search history.

(56) References Cited

U.S. PATENT DOCUMENTS

| | | | |
|---|---|---|---|
| 2018/0045519 | A1 | 2/2018 | Ghadiok et al. |
| 2019/0302220 | A1 | 10/2019 | Kumar et al. |
| 2019/0302275 | A1* | 10/2019 | Tao .................... G01S 19/48 |
| 2019/0323844 | A1 | 10/2019 | Yendluri et al. |
| 2021/0141100 | A1* | 5/2021 | Castorena Martinez .................... G01S 5/0072 |

FOREIGN PATENT DOCUMENTS

| | | |
|---|---|---|
| CN | 106842271 A | 6/2017 |
| CN | 104848856 B | 9/2017 |
| CN | 107909614 A | 4/2018 |
| CN | 108345020 A | 7/2018 |
| CN | 108917762 A | 11/2018 |
| CN | 109059902 A | 12/2018 |
| CN | 109523581 A | 3/2019 |
| CN | 109540148 A | 3/2019 |
| CN | 109932741 A | 6/2019 |
| CN | 110007300 A | 7/2019 |
| CN | 110221276 A | 9/2019 |
| CN | 110361008 A | 10/2019 |
| CN | 110398729 A | 11/2019 |
| CN | 110609290 A | 12/2019 |
| CN | 111413721 A | 7/2020 |
| WO | 2018233699 A1 | 12/2018 |

OTHER PUBLICATIONS

Kukshya et al., "Performance Evaluation of a System for Estimating Relative Positions of Vehicles During GPS Outages," Intelligent Vehicles Symposium 2006, Tokyo, Japan, Jun. 13-15, 2006, 6 pages.

Lu et al., "An Algorithm of Multi-Vehicle Cooperative Positioning Considering Uncertainty in V2V," Journal of Transport Information and Safety, vol. 5, May 31, 2018, 9 pages (with English abstract).

Chao, "Research on Vehicle Blind Spot Positioning Technology in Internet of Vehicles," Light Industry Science and Technology, Issue 08, Aug. 2016, 5 pages (with English abstract).

Office Action in Chinese Appln. No. 202010177804.4, dated Apr. 22, 2022, 8 pages (with English translation).

Office Action in Chinese Appln. No. 202010177804.4, dated Nov. 2, 2021, 16 pages (with English translation).

Office Action in Indian Appln. No. 202227040470, dated Oct. 17, 2022, 6 pages (with English translation).

International Search Report and Written Opinion in International Appln. No. PCT/CN2020/125761, mailed on Jan. 29, 2021, 18 pages (with English translation).

Extended European Search Report in European Appln No. 20914151.4, dated May 24, 2023, 8 pages.

* cited by examiner

VEHICLE POSITIONING METHOD, APPARATUS, AND CONTROLLER, INTELLIGENT VEHICLE, AND SYSTEM

CROSS-REFERENCE TO RELATED APPLICATIONS

This application is a continuation of International Application No. PCT/CN2020/125761, filed on Nov. 2, 2020, which claims priority to Chinese Patent Application No. 202010177804.4, filed on Mar. 13, 2020 and Chinese Patent Application No. 202010038272.6, filed on Jan. 14, 2020. All of the aforementioned patent applications are hereby incorporated by reference in their entireties.

TECHNICAL FIELD

This application relates to the field of an intelligent vehicle (intelligent driving), and in particular, to a vehicle positioning method, apparatus, and controller, an intelligent vehicle, and a system.

BACKGROUND

The global positioning system (GPS) is characterized by good performance, high precision, and wide application, and is a commonly used navigation and positioning system so far. Currently, the GPS has been widely applied to the field of vehicle positioning. The application of the GPS to vehicles can implement navigation and positioning, security control, intelligent transportation, and the like, and has a good development trend.

A GPS technology is widely applied to vehicle positioning, for example, may be applied to an intelligent vehicle that supports unmanned driving (unmanned driving), assisted driving (driver assistance/ADAS), intelligent driving (intelligent driving), connected driving (connected driving), intelligent network driving (intelligent network driving), or car sharing (car sharing). During actual application, a GPS signal may be weak or even there is no GPS signal due to hardware and/or communication. In this case, if vehicle positioning is still performed based on the GPS, a relatively severe security problem is caused.

SUMMARY

This application provides a vehicle positioning method and apparatus, and a readable storage medium, to resolve a vehicle positioning problem when a GPS signal is weak or there is no GPS signal.

According to a first aspect, an embodiment of this application provides a vehicle positioning method. In this method, a controller obtains a first relative pose between a first vehicle and a help providing object and a global pose of the help providing object; and calculates a global pose of the first vehicle based on the first relative pose and the global pose. The first relative pose is used to indicate a position and a posture of the help providing object relative to the first vehicle by using the first vehicle as a reference, the first relative pose is a pose of the help providing object that is determined in a first coordinate system, and the global pose is a global pose of the help providing object that is determined in a second coordinate system. In this way, when a GPS signal of the first vehicle is weak or there is no GPS signal, the global pose of the first vehicle may be determined based on the global pose of the help providing object and the first relative pose between the first vehicle and the help providing object.

In a possible implementation, the help providing object is a second vehicle, the first relative pose is used to indicate a position and a posture of the second vehicle relative to the first vehicle by using the first vehicle as a reference, and the posture is used to indicate a vehicle head orientation of the second vehicle by using a vehicle head orientation of the first vehicle as a reference. In this way, when a GPS signal of the first vehicle is weak or there is no GPS signal, the first vehicle may seek help from another vehicle, and the vehicle head orientation of the first vehicle may be determined based on information about the another vehicle, so that the first vehicle can be assisted in implementing autonomous driving in the intelligent vehicle field.

In another possible implementation, the obtaining a first relative pose between a first vehicle and a help providing object includes: obtaining first point cloud data in the first coordinate system that is obtained by a laser radar of the first vehicle by scanning an object around the first vehicle; obtaining second point cloud data in the second coordinate system that is obtained by a laser radar of the second vehicle by scanning an object around the second vehicle, where the laser radar of the first vehicle and the laser radar of the second vehicle have an overlapping scanning area, and for an obstacle in the overlapping scanning area, the first point cloud data includes point cloud data corresponding to the obstacle, and the second point cloud data includes point cloud data corresponding to the obstacle; and calculating the first relative pose based on the point cloud data corresponding to the obstacle in the first point cloud data and the point cloud data corresponding to the obstacle in the second point cloud data. Because the laser radars deployed on the two vehicles have the overlapping scanning area, point cloud matching may be performed based on the point cloud data obtained through scanning by the laser radars deployed on the two vehicles, so that a relatively accurate relative pose between the two vehicles is determined.

In another possible implementation, the determining the first relative pose based on the first point cloud data and the second point cloud data includes: the calculating the first relative pose based on the point cloud data corresponding to the obstacle in the first point cloud data and the point cloud data corresponding to the obstacle in the second point cloud data includes: converting the first point cloud data in the first coordinate system to a preset first reference coordinate system of the first vehicle, to obtain third point cloud data, where the first reference coordinate system is a coordinate system obtained after an origin of the first coordinate system is translated to a preset first reference point; converting the second point cloud data in the second coordinate system to a preset second reference coordinate system of the second vehicle, to obtain fourth point cloud data, where the second reference coordinate system is a coordinate system obtained after an origin of the second coordinate system is translated to a preset second reference point; and performing point cloud matching on point cloud data corresponding to the obstacle in the third point cloud data and point cloud data corresponding to the obstacle in the fourth point cloud data, to obtain the first relative pose. In this way, the first point cloud data and the second point cloud data each may be converted to the reference coordinate system of the respective vehicle, and the origin point of the reference coordinate system of each vehicle is corresponding to the position of the vehicle. For example, the origin of the reference coordinate system of each vehicle is located at a rear axle center of the vehicle, so that a relatively accurate relative pose between the two vehicles can be determined.

In another possible implementation, the performing point cloud matching on point cloud data corresponding to the obstacle in the third point cloud data and point cloud data corresponding to the obstacle in the fourth point cloud data, to obtain the first relative pose includes: performing N iterations based on the point cloud data corresponding to the obstacle in the third point cloud data and the point cloud data corresponding to the obstacle in the fourth point cloud data, to obtain a third transformation matrix that is output by the $N^{th}$ iteration, where N is a positive integer; and determining the first relative pose based on the third transformation matrix that is output by the $N^{th}$ iteration. For the $i^{th}$ iteration in the N iterations, i is a positive integer not greater than N, and the following operations are performed for each of M points of the obstacle: performing, based on a third transformation matrix that is output by the $(i-1)^{th}$ iteration, one transformation on point cloud data corresponding to the point in third point cloud data, to obtain transformed point cloud data corresponding to the point, and calculating a difference between the transformed point cloud data corresponding to the point and point cloud data corresponding to the point in the fourth point cloud data, to obtain a residual corresponding to the point, where M is a positive integer; calculating a residual sum based on a residual corresponding to each of the M points of the obstacle; and if the residual sum is not less than a preset residual threshold, updating, by using a preset transformation amount, the third transformation matrix that is output by the $(i-1)^{th}$ iteration, and using an updated third transformation matrix that is output by the $(i-1)^{th}$ iteration as a third transformation matrix that is output by the $i^{th}$ iteration, to perform a next iteration; or if the residual sum is less than the residual threshold, ending the iteration, and using the third transformation matrix that is output by the $(i-1)^{th}$ iteration as the third transformation matrix that is output by the $N^{th}$ iteration. In this way, a relatively accurate third transformation matrix may be solved through the N iterations, so that a more accurate first relative pose is determined.

In another possible implementation, when i is 1, the third transformation matrix that is output by the $(i-1)^{th}$ iteration is determined based on the following content: calculating an estimated global pose of the first vehicle at a current moment based on a global pose of the first vehicle at a previous moment and a pose of the first vehicle at the current moment relative to the previous moment that is calculated based on an IMU by using the global pose of the first vehicle at the previous moment as a reference; obtaining a global pose of the second vehicle at the current moment based on a global positioning system GPS and an IMU; determining a second relative pose based on the estimated global pose of the first vehicle at the current moment and the global pose of the second vehicle at the current moment, where the second relative pose is used to indicate a position and a posture of the help providing object relative to the first vehicle by using the first vehicle as a reference, and the second relative pose is a pose of the help providing object that is determined in the first coordinate system; and using a matrix used to express the second relative pose as the third transformation matrix that is output by the $(i-1)^{th}$ iteration. In this way, an initial value of the third matrix may be provided for the N iterations. Because the initial value of the third matrix is determined based on the estimated global pose of the first vehicle at the current moment and the global pose of the second vehicle at the current moment, the initial value of the third matrix is relatively close to the third transformation matrix that is output by the $N^{th}$ iteration. This can further reduce a quantity of iterations, and shorten a time for finding an optimal solution.

In another possible implementation, the global pose of the first vehicle at the previous moment may be obtained based on the following content: a latest GPS-based global pose of the first vehicle that is recorded by a system and a pose of the first vehicle at the current moment relative to a first moment that is calculated by using a global pose of the first vehicle at the first moment as a reference based on the IMU. The first moment is a moment of recording the latest GPS-based global pose of the first vehicle by the system.

In another possible implementation, the global pose of the first vehicle at the previous moment may be obtained based on the following content: a calculated latest global pose of the first vehicle and a pose of the first vehicle at the current moment relative to a second moment that is calculated by using a global pose of the first vehicle at the second moment as a reference based on the IMU. The second moment is a moment of calculating the latest global pose of the first vehicle. In this way, solution flexibility can be improved.

To improve the solution flexibility, there may be a plurality of solutions for determining the first relative pose in this application. In another possible implementation, the third transformation matrix that is output by the $N^{th}$ iteration is used as a mathematical expression of the first relative pose. In another possible implementation, weighted fusion is performed on the third transformation matrix that is output by the $(i-1)^{th}$ iteration and the third transformation matrix that is output by the $N^{th}$ iteration, to obtain a fourth transformation matrix, and the fourth transformation matrix is used as a mathematical expression of the first relative pose. In this possible implementation, the obtained first relative pose may be more accurate, so that a more accurate global pose can be calculated.

In another possible implementation, the calculating the second relative pose based on the first relative pose and a relative pose initial value includes: performing weighted fusion on the first relative pose and the relative pose initial value, to obtain the second relative pose.

In another possible implementation, before the first relative pose between the first vehicle and the help providing object is obtained, the method further includes: determining that an error of a GPS-based global pose of the first vehicle is greater than an error threshold, or a GPS positioning apparatus on the first vehicle is faulty.

When the controller is deployed on the first vehicle, the obtaining a global pose of the help providing object includes: sending a first request to the help providing object, where the first request carries an identifier of the first vehicle; and receiving the global posture of the help providing object that is sent by the help providing object.

In another possible implementation, after the global pose of the first vehicle is determined based on the first relative pose and the global pose of the help providing object, the method further includes: obtaining a global pose of the first vehicle corresponding to each of a plurality of help providing objects; and performing weighted fusion on global poses of a plurality of first vehicles corresponding to the plurality of help providing objects, to obtain a target global pose of the first vehicle.

According to a second aspect, a vehicle positioning apparatus is provided. The apparatus includes modules configured to perform the vehicle positioning method according to any one of the first aspect and the possible implementations of the first aspect.

According to a third aspect, a vehicle positioning controller is provided. The controller includes a processor and a memory. The memory is configured to store computer-executable instructions, and when the controller runs, the processor executes the computer-executable instructions in the memory to perform the operation steps of the method according to any one of the first aspect and the possible implementations of the first aspect.

According to a fourth aspect, this application provides an intelligent vehicle. The intelligent vehicle includes the controller according to any one of the third aspect and the possible implementations of the third aspect.

According to a fifth aspect, this application further provides a vehicle positioning system. The system includes a first vehicle and a cloud computing platform. The cloud computing platform is configured to perform functions of the controller according to any one of the third aspect and the possible implementations of the third aspect.

According to a sixth aspect, this application further provides a vehicle positioning system. The system includes a first vehicle and a help providing object. The help providing object is configured to perform functions of the controller according to any one of the third aspect and the possible implementations of the third aspect.

According to a seventh aspect, this application provides a computer-readable storage medium. The computer-readable storage medium stores instructions, and when the computer-readable storage medium runs on a computer, the computer is enabled to perform the method according to the foregoing aspect.

According to an eighth aspect, this application provides a computer program product including instructions. When the computer program product runs on a computer, the computer is enabled to perform the method according to the foregoing aspect.

In this application, based on the implementations according to the foregoing aspects, the implementations may be further combined to provide more implementations.

DESCRIPTION OF EMBODIMENTS

Figure 1:
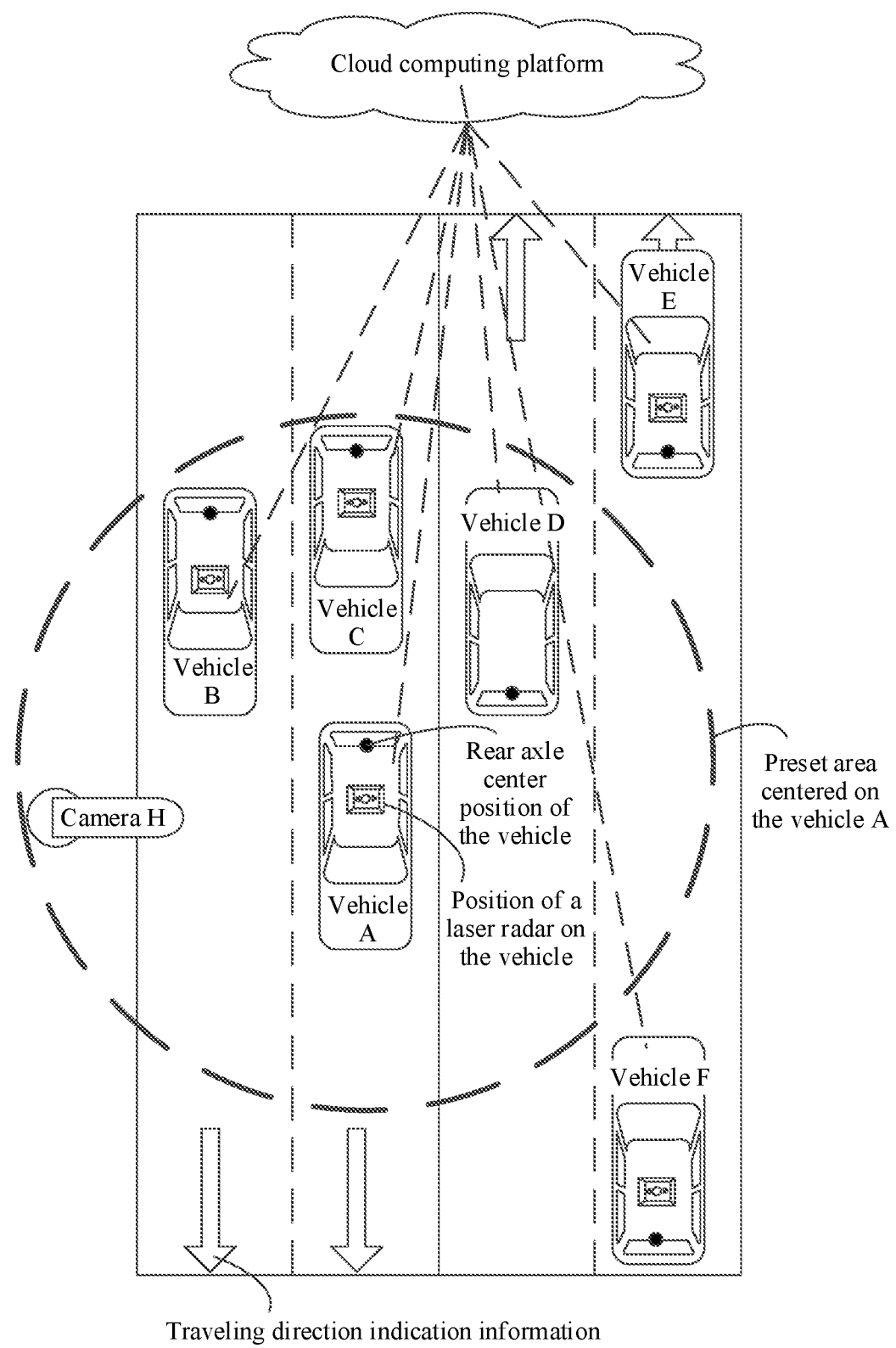
FIG. 1 is a schematic diagram of an application scenario according to this application.

For ease of understanding, the following first explains proprietary concepts and nouns in embodiments of this application.

(1) Global Pose

The global pose may also be referred to as an absolute pose, and means a position and a posture of an object in a reference coordinate system. The reference coordinate system may be a multi-dimensional coordinate system. The multi-dimensional coordinate system includes a coordinate system having a plurality of dimensions, for example, a two-dimensional coordinate system or a three-dimensional coordinate system, and may be specifically a geodetic coordinate system, a universal transverse mercator (UTM) grid system (grid system), or the like.

The position of the object may be represented by coordinate values of coordinate axes in the coordinate system. One object may have different coordinate values in different coordinate systems. In embodiments of this application, a position of a vehicle may be represented by a coordinate value of each coordinate axis in a coordinate system in which the vehicle is located. For ease of calculation, the position of the vehicle may also be represented by coordinate values of coordinate axes in a reference coordinate system. When positions of a plurality of objects are respectively identified by using a plurality of coordinate systems, the positions of all the objects may be determined by using one coordinate system as a reference, to further determine positions of other objects in the reference coordinate system. A coordinate system used as a reference is also referred to as a reference coordinate system, and may be a coordinate system in which any object is located, or may be a third-party public coordinate system. This is not limited in embodiments of this application.

For a vehicle, the posture of the object may be understood as a vehicle head orientation of the vehicle or an orientation of any position of a vehicle body, and may be specifically determined based on an included angle between a vector corresponding to the vehicle and a horizontal coordinate axis in a multi-dimensional coordinate system. The vector indicates both a size and a direction. Both a vehicle head direction and a vehicle traveling direction can be determined by using the posture of the vehicle.

(2) Relative Pose

The relative pose is a pose of either of two objects relative to the other object. For example, the relative pose is a pose of an object 02 relative to an object 01 by using the object 01 as a reference, or a pose of the object 01 relative to the object 02 by using the object 02 as a reference. A first relative pose between a first vehicle (which may also be referred to as a faulty vehicle) and a help providing object in embodiments of this application may be a pose of the help providing object relative to the first vehicle by using the first vehicle as a reference, or a position of the first vehicle relative to the help providing object by using the help providing object as a reference.

(3) Point Cloud Data

The point cloud data is a set of a group of vectors in a three-dimensional coordinate system. These vectors are generally represented in a form of a three-dimensional coordinate including X, Y, and Z axes, and are generally mainly used to represent an outer surface shape of an object. In addition to geometric position information represented by (X, Y, Z), the point cloud data may alternatively represent an RGB color, a grayscale value, a depth, a segmentation result, or the like of a point.

The point cloud data in embodiments of this application may be obtained through scanning by a laser radar, and the laser radar may also be referred to as a light detection and ranging (Light Detection and Ranging, LiDAR) system.

(4) Transformation Matrix

The transformation matrix is a concept in mathematical linear algebra. In linear algebra, a linear transformation can be represented by a transformation matrix. Most commonly used geometric transformations are all linear transformations, including rotation, translation, scaling, shear, reflection, and orthographic projection. In embodiments of this application, an example in which linear transformations include rotation and translation is used for description. In other words, the linear transformations that may be represented by the transformation matrix include rotation and translation.

With reference to the accompanying drawings, the following further describes a vehicle positioning method provided in embodiments of this application. FIG. 1 is a schematic diagram of an application scenario according to an embodiment of this application. As shown in FIG. 1, lane traveling direction indication information indicates four lanes. Traveling directions of the two left lanes are consistent, and vehicle traveling directions of the two right lanes are consistent. Any vehicle may be an intelligent vehicle or a non-intelligent vehicle. This is not limited in this embodiment of this application. A sensor is disposed on each vehicle, and the sensor is configured to detect an obstacle around the vehicle. The sensor includes a laser radar, a millimeter-wave radar, and a camera. In addition, one or more types of sensors may be disposed on each vehicle, and there may be one or more sensors of each type. The sensor may be installed on a top of the vehicle, and may be specifically disposed at a middle position on the top of the vehicle. A sensor installation position and quantity in each vehicle are not limited in this embodiment of this application. In this embodiment of this application, the vehicle may communicate with another object based on a vehicle-to-everything (vehicle-to-everything (V2X)) wireless communications technology. For example, vehicle-to-vehicle communication may be implemented based on a vehicle-to-vehicle (vehicle-to-vehicle (V2V)) wireless communications technology. The vehicle may communicate with the another object based on wireless fidelity (wireless fidelity (Wi-Fi)), a fifth generation (5th generation, 5G) mobile communications technology, or the like. For example, communication between the vehicle and an intelligent device (for example, a smartphone or a mobile device that supports a positioning function) may be implemented based on 5G.

Optionally, the application scenario shown in FIG. 1 may further include a cloud computing platform. The computing platform may be implemented by a cloud server or virtual machine.

In this embodiment of this application, a controller for determining a global pose of a first vehicle may be located on the first vehicle, and may be specifically implemented by a positioning system controller, an intelligent driving controller, or any other device having a computing capability on the vehicle. Alternatively, the controller may be located on a help providing object. In this case, the controller may alternatively be any device or component having a computing capability on the help providing object. After determining the global pose of the first vehicle, the controller sends the global pose of the first vehicle to the first vehicle. In addition, the controller may alternatively be located on the cloud computing platform (in this case, a function of the controller may be implemented by the cloud virtual machine or server). In this case, after determining the global pose of the first vehicle, the controller sends the global pose of the first vehicle to the first vehicle.

The following uses an example in which the sensor is a laser radar in the scenario shown in FIG. 1 and it is assumed that the first vehicle is a vehicle A and a GPS exception occurs during traveling, to further describe a manner in which the vehicle A performs positioning by using another object. Both the vehicle A and the another object are provided with communications modules. The vehicle A may find, by using the communications module, a radio signal sent by the another object in a preset area. The preset area of the vehicle A is shown by a dashed line circle in FIG. 1, and is an area that uses the vehicle A as a center and uses a preset distance as a radius. The preset distance may be a value less than or equal to a radius of coverage of a radio signal sent by the vehicle A.

In this embodiment of this application, the help providing object used to help the vehicle A perform positioning may be a vehicle, for example, one or more of a vehicle B, a vehicle C, and a vehicle D, or may be another object that has a positioning capability or that can learn of positioning information, for example, some infrastructures on which communications modules are installed on two sides of a road, such as a utility pole, a mobile base station, a mobile electronic device (for example, a smartphone having a positioning function) carried by a pedestrian, or a camera on which a communications module is installed. An example infrastructure shown in FIG. 1 is a camera H in the preset area centered on the vehicle A. FIG. 1 further shows a vehicle E and a vehicle F. Because the vehicle E and the vehicle F are outside the preset area centered on the vehicle A, the vehicle A does not perform positioning with the help of the vehicle E and the vehicle F.

In an optional implementation, after finding the another object in the preset area, the vehicle A may send a first request to the another object, to request the another object to assist the vehicle A in positioning. The another object found by the vehicle A includes the help providing object in the foregoing content.

In another optional implementation, after finding the another object in the preset area, the vehicle A may first establish mutual trust with the another object. To be specific, the vehicle A first performs security authentication on the found another object, and then sends the first request to the another object after the authentication succeeds. The another object that is successfully authenticated includes the help providing object in the foregoing content. A possible process of establishing the mutual trust is as follows: After the vehicle A finds the another object in the preset area, for each found object, the vehicle A may send first signaling to the object by using the communications module. The first signaling is used to request to establish a communication link with the object. The first signaling may carry an identifier used to indicate the vehicle A, and the identifier includes information that can uniquely indicate the vehicle globally, for example, an engine number or a serial number of the vehicle. After receiving the first signaling, the communications module of the object may perform verification on the vehicle A. A specific identity verification process may be as follows: The object performs verification based on a preset mutual trust list, or the object requests a third-party system to perform identity verification on the vehicle A, and then sends second signaling to the vehicle A after the verification succeeds. The second signaling is used to indicate that the object agrees to establish mutual trust with the vehicle A.

Figure 2:
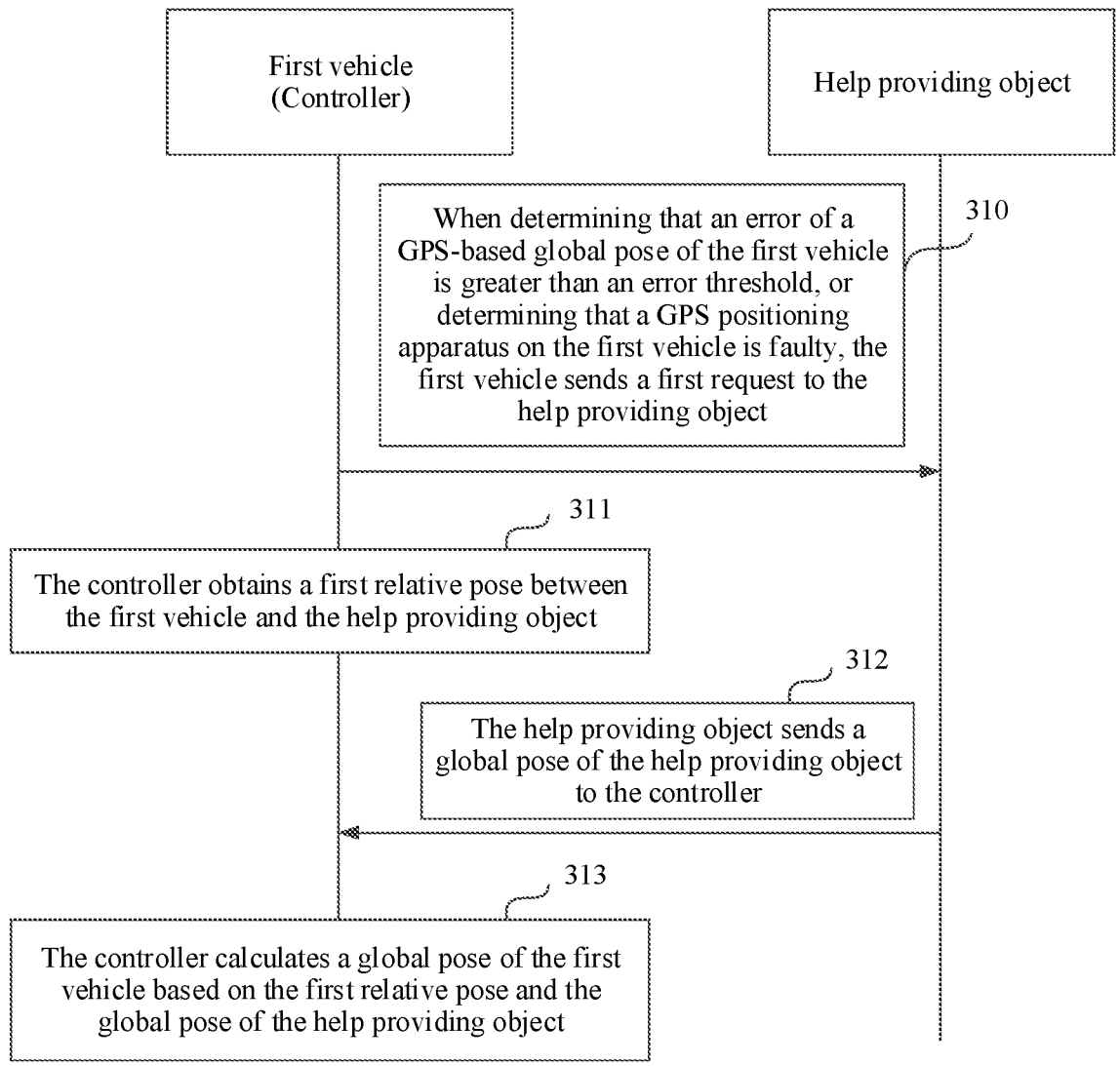
FIG. 2 is a schematic flowchart of a vehicle positioning method used when a controller is deployed on a first vehicle according to this application.

FIG. 2 is a schematic flowchart of a vehicle positioning method according to an embodiment of this application that is further explained by using an example in which a first vehicle is a faulty vehicle and a controller is deployed on the first vehicle according to this embodiment of this application. As shown in FIG. 2, the method includes the following steps.

Step 310: When determining that an error of a GPS-based global pose of the first vehicle is greater than an error threshold, or determining that a GPS positioning apparatus on the first vehicle is faulty, the first vehicle sends a first request to a help providing object.

The first request is used to indicate that the first vehicle needs to seek help in positioning. The first request may include an identifier of the first vehicle. The identifier of the first vehicle includes information that can uniquely indicate the first vehicle globally, for example, an engine number of the first vehicle or a serial number of the first vehicle.

Correspondingly, the help providing object receives the first request.

Step 311: The controller obtains a first relative pose between the first vehicle and the help providing object. The first relative pose is used to indicate a position and a posture of the help providing object relative to the first vehicle by using the first vehicle as a reference, and the first relative pose is a pose of the help providing object that is determined in a first coordinate system. The first coordinate system may be a coordinate system in which a sensor of the first vehicle is located. For example, the first coordinate system may be a coordinate system established by using a central position of the sensor of the first vehicle as an origin.

Step 312: The help providing object sends a global pose of the help providing object to the controller.

The global pose is a global pose of the help providing object that is determined in a second coordinate system. The second coordinate system may be a coordinate system in which a sensor of a second vehicle is located. For example, the second coordinate system may be a coordinate system established by using a central position of the sensor of the second vehicle as an origin.

Correspondingly, the controller receives the global pose of the help providing object that is sent by the help providing object.

Step 313: The controller calculates a global pose of the first vehicle based on the first relative pose and the global pose of the help providing object.

The global pose of the first vehicle is also a global pose of the first vehicle in the second coordinate system. The second coordinate system may be a multi-dimensional coordinate system such as a two-dimensional coordinate system or a three-dimensional coordinate system, for example, the geodetic coordinate system or the UTM grid system mentioned above.

It can be learned from the solution provided in step 311 to step 313 that, in a vehicle traveling process, if a GPS signal is weak or there is no GPS signal, the controller may calculate the global pose of the first vehicle based on the global pose of the help providing object and the first relative pose between the help providing object and the first vehicle, to resolve a vehicle positioning problem when the GPS signal is weak or there is no GPS signal. If the solution is applied to the unmanned driving field, the solution can resolve a vehicle positioning problem when a GPS signal is weak or there is no GPS signal in an unmanned driving application scenario.

In a possible implementation, the first vehicle may seek help from one or more help providing objects. The help providing object may be a vehicle. In this case, the vehicle may also be referred to as a help providing vehicle. After using a vehicle as the help providing vehicle, the first vehicle sends a request to the help providing vehicle, determines a first relative pose of the first vehicle by using the help providing vehicle as a reference, and determines a global pose of the first vehicle based on the first relative pose and a global pose of the help providing vehicle. Optionally, the first vehicle may alternatively select a plurality of help providing objects to seek help. For example, the first vehicle may seek help from K help providing objects, where K is a positive integer. When K is a positive integer greater than 1, for each of the K help providing objects, the controller may calculate, based on a global pose of the help providing object and a first relative pose between the first vehicle and the help providing object, a global pose of the first vehicle corresponding to the help providing object. Finally, global poses of K first vehicles corresponding to the K help providing objects may be obtained. Further, the global pose of the first vehicle may be calculated based on the global poses of the K first vehicles corresponding to the K help providing objects. A global pose of one first vehicle that is determined based on global poses of first vehicles corresponding to a plurality of help providing objects is referred to as a target global pose of the first vehicle.

There may be a plurality of solutions for calculating the global pose of the first vehicle based on the global poses of the K first vehicles. During specific implementation, any one of the following manners may be used.

Manner 1: Use one of the global poses of the K first vehicles as the global pose of the first vehicle.

The controller may select any one of the K global poses of the K first vehicles as the global pose of the first vehicle. Alternatively, the controller may select a global pose with a highest trustworthiness level in the K global poses as the global pose of the first vehicle based on a trustworthiness level of each of the K global poses.

A trustworthiness level of a global pose may be related to one or more of the following parameter items:

Parameter item 1: strength of a radio signal sent by a help providing object corresponding to the global pose. If the strength of the radio signal sent by the help providing object corresponding to the global pose is stronger, a parameter value of the parameter item is larger; otherwise, the parameter value of the parameter item is smaller.

Parameter item 2: a distance between the help providing object corresponding to the global pose and the first vehicle. If the distance between the help providing object corresponding to the global pose and the first vehicle is smaller, a parameter value of the parameter item is larger; otherwise, the parameter value of the parameter item is smaller.

Parameter item 3: an identity of the help providing object corresponding to the global pose (a smart utility pole, a smart camera, a vehicle, or the like). A correspondence between the identity of the help providing object and a parameter value of the parameter item may be preset based on the identity of the help providing object. For example, when the identity of the help providing object is the vehicle, the parameter value of the parameter item is 80 points; when the identity of the help providing object is the smart utility pole, the parameter value of the parameter item is 60 points; or when the identity of the help providing object is the smart camera, the parameter value of the parameter item is 50 points. In a possible implementation, a corresponding parameter value may be manually set for the parameter item based on the identity, a hardware capability, or the like of the help providing object.

Parameter item 4: a sensor type (a laser radar sensor, a millimeter-wave radar, a camera, or the like) used in a process of calculating the global pose. A correspondence between the sensor type and a parameter value of the parameter item may be preset. For example, when the sensor type is the laser radar sensor, the parameter value of the parameter item is 80 points; when the sensor type is the millimeter-wave radar, the parameter value of the parameter item is 60 points; or when the sensor type is the camera, the parameter value of the parameter item is 50 points.

When a trustworthiness level of a global pose is related to a plurality of parameter items, a weight corresponding to each parameter item may be preset, and weighted addition is performed on parameter values of the plurality of parameter items, to obtain the trustworthiness level of the global pose.

Manner 2: Calculate the global pose of the first vehicle based on the global poses of the K first vehicles.

The controller separately obtains the K global poses of the K first vehicles corresponding to the K help providing objects, and then performs weighted fusion on the K global poses, to obtain the target global pose of the first vehicle. A process of performing weighted fusion on the K global poses may specifically include: determining weights respectively corresponding to the K global poses, and then performing weighted addition on all the global poses.

A weight of a global pose is related to a trustworthiness level of the global pose. For example, a higher trustworthiness level of the global pose may indicate a larger weight of the global pose, and a lower trustworthiness level of the global pose may indicate a smaller weight of the global pose. It should be noted that the weighted fusion performed in Manner 2 may be Kalman filtering fusion, and Kalman filtering fusion may be specifically performed by using a conventional method or an improved algorithm of the method. This is not limited in this embodiment of this application.

In the solution provided in Manner 1, the target global pose of the first vehicle is calculated based on one global pose. The calculation process is relatively simple, and a calculation speed is relatively fast. In the solution provided in Manner 2, the target global pose of the first vehicle is calculated based on the K global poses. This can improve precision of the target global pose of the first vehicle.

Next, a specific process of determining the first relative pose in step 311 is further described by using an example in which the help providing object is the second vehicle and a laser radar is installed on each of the first vehicle and the second vehicle. Obstacle information detected by the laser radar is represented by point cloud data. The controller obtains first point cloud data through scanning by the laser radar of the first vehicle and second point cloud data through scanning by the laser radar of the second vehicle. A coordinate system to which the first point cloud data belongs is generally a multi-dimensional coordinate system established by using a position of a device that collects the first point cloud data as an origin, that is, a multi-dimensional coordinate system established by using a position of the laser radar of the first vehicle as an origin. Similarly, the second coordinate system is generally a multi-dimensional coordinate system established by using a position of a device that collects the second point cloud data as an origin, that is, a multi-dimensional coordinate system established by using a position of the laser radar of the second vehicle as an origin.

For each piece of the first point cloud data and the second point cloud data, in this embodiment of this application, screening may be performed on the point cloud data obtained by the laser radar through scanning. For example, point cloud data whose curvature is greater than a curvature threshold (the point cloud data whose curvature is greater than the curvature threshold may also be understood as point cloud data corresponding to a point on a surface of an object scanned by the laser radar) may be obtained from the point cloud data through screening. Because the laser radar of the first vehicle and the laser radar of the second vehicle have an overlapping scanning area, both the first point cloud data and the second point cloud data include point cloud data corresponding to one or more obstacles in the overlapping scanning area (screening is performed on the first point cloud data and the second point cloud data, and after the screening, both the first point cloud data and the second point cloud data include the point cloud data corresponding to points on surfaces of the one or more obstacles in the overlapping scanning area). It may also be understood that a point of one obstacle in the overlapping scanning area is corresponding to a set of a group of vectors in the first coordinate system, and is also corresponding to a set of a group of vectors in the second coordinate system. Further, a first relative pose between the first vehicle and the second vehicle may be determined based on the sets of the two groups of vectors of the obstacle in the two different coordinate systems. The first relative pose is used to indicate a position and a posture of the help providing object relative to the first vehicle by using the first vehicle as a reference, and the first relative pose is a pose of the help providing object that is determined in the first coordinate system.

A process of determining the first relative pose is described in detail in the following content.

Manner 1: Separately select the first vehicle and the second coordinate system, and perform coordinate conversion on the first point cloud data and the second point cloud data in respectively corresponding reference coordinate systems.

The laser radars of the two vehicles may be installed at different positions on the respectively corresponding vehicles. For example, the laser radar of the first vehicle is installed at a position close to a vehicle head, and the laser radar of the second vehicle is installed at a position close to a vehicle rear. In addition, a multi-dimensional coordinate system of point cloud data obtained by a laser radar through scanning is generally established by using a position of the laser radar as an origin. Therefore, the origin of the first coordinate system is close to the vehicle head of the first vehicle, and the origin of the second coordinate system is close to the vehicle rear of the second vehicle. In this case, if point cloud matching is directly performed on the second point cloud data and the first point cloud data by using the first coordinate system as a reference, an obtained point cloud matching result reflects a relative pose of the vehicle rear of the second vehicle relative to the vehicle head of the first vehicle by using the vehicle head of the first vehicle as a reference. Obviously, the relative pose cannot accurately express a relative pose between the first vehicle and the second vehicle. A more accurate relative pose between the first vehicle and the second vehicle may be, for example, a relative pose of a vehicle head of the second vehicle relative to the vehicle head of the first vehicle by using the vehicle head of the first vehicle as a reference, or a relative pose of the vehicle rear of the second vehicle relative to a vehicle rear of the first vehicle by using the vehicle rear of the first vehicle as a reference.

To more accurately determine the first relative pose between the first vehicle and the second vehicle, two reference coordinate systems may be respectively selected for the first vehicle and the second vehicle. For example, a first reference coordinate system is selected for the first vehicle, and a second reference coordinate system is selected for the second vehicle. The first reference coordinate system is a coordinate system obtained after the origin of the first coordinate system is translated to a preset first reference point. In other words, an origin of the first reference coordinate system is a first reference point. The second reference coordinate system is a coordinate system obtained after the origin of the second coordinate system is translated to a preset second reference point. In other words, an origin of the second reference coordinate system is a second reference point. Coordinate axes of the first reference coordinate system are respectively parallel to those of the second reference coordinate system (for example, if both the first reference coordinate system and the second reference coordinate system are X/Y/Z three-dimensional coordinate systems, an X axis of the first reference coordinate system is parallel to an X axis of the second reference coordinate system, a Y axis of the first reference coordinate system is parallel to a Y axis of the second reference coordinate system, and a Z axis of the first reference coordinate system is parallel to a Z axis of the second reference coordinate system). Then, the first point cloud data is converted to the first reference coordinate system, and the second point cloud data is converted to the second reference coordinate system. Subsequently, point cloud matching is performed on the point cloud data converted to the two reference coordinate systems, to obtain a point cloud matching result.

A position of the first reference point on the first vehicle and a position of the second reference point on the second vehicle are same parts of the vehicles. Specifically, the first reference point and the second reference point may be points on vehicle bodies of the two vehicles. For example, the first reference point may be a rear axle center of the first vehicle, and the second reference point may be a rear axle center of the second vehicle. For another example, the first reference point may be a central axle center of the vehicle head of the first vehicle, and the second reference point may be a central axle center of the vehicle head of the second vehicle. For another example, the first reference point may be a vehicle roof center of the first vehicle, and the second reference point may be a vehicle roof center of the second vehicle.

An example in which the first reference point is the rear axle center of the first vehicle, and the second reference point is the rear axle center of the second vehicle is used for description. First, coordinate system conversion is performed on the first point cloud data obtained by the laser radar of the first vehicle through scanning, to convert the first point cloud data to the first coordinate system. A coordinate system conversion process may be translating an origin of a coordinate system to an origin of a reference coordinate system. For example, the origin of the first coordinate system is moved from the position of the laser radar of the first vehicle to the rear axis center of the first vehicle. For ease of description, the first point cloud data for which the origin of the coordinate system is moved to the rear axis center of the first vehicle is referred to as third point cloud data. Similar to the process of performing coordinate conversion on the point cloud data of the first vehicle, coordinate system conversion also needs to be performed on the second point cloud data obtained by the laser radar of the second vehicle through scanning, to convert the second point cloud data to the second coordinate system. The origin of the second coordinate system is moved from the position of the laser radar of the second vehicle to the rear axis center of the second vehicle. For ease of description, the second point cloud data for which the origin of the coordinate system is moved to the rear axis center of the second vehicle is referred to as fourth point cloud data.

After origins of different coordinate systems are translated, each coordinate value in the different coordinate systems further needs to be converted, and specifically may be obtained by multiplying point coordinates by a transformation matrix. For example, one point is represented in a coordinate system S1 (in other words, represented by coordinate values of coordinate axes in the coordinate system S1). If coordinate system conversion needs to be performed on the point to convert the point to a coordinate system S2 (in other words, the point is represented in the coordinate system S2), the point may be multiplied by a transformation matrix. For example, coordinate axes of an origin of the coordinate system S1 is (0, 0, 0) in the coordinate system S1, and is (x1, y1, z1) in the coordinate system S2. Herein, (x1, y1, z1) is a value obtained by multiplying the origin of the coordinate system S1 by the transformation matrix.

Figure 3:
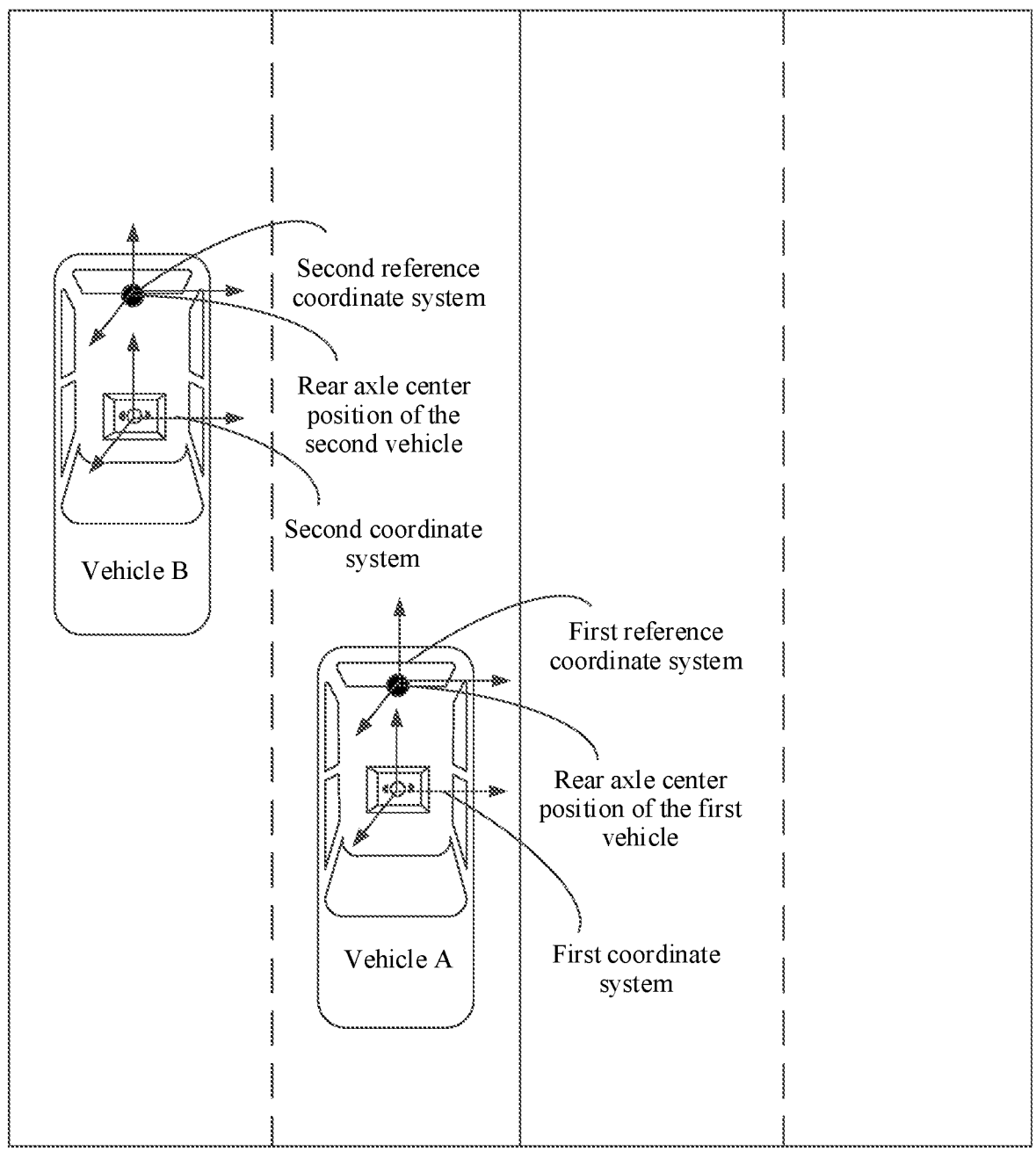
FIG. 3 is a schematic diagram of performing coordinate system conversion by using a vehicle A and a vehicle B shown in FIG. 1 as an example according to this application.

FIG. 3 is a schematic diagram of example coordinate system conversion between the vehicle A and the vehicle B in FIG. 1. As shown in FIG. 3, for example, the vehicle A is the first vehicle and the vehicle B is the second vehicle. Point cloud data obtained by the vehicle A through scanning is referred to as the first point cloud data. A coordinate axis center of the first point cloud data is located on the laser radar of the vehicle A. A coordinate system to which the first point cloud data belongs is referred to as a first coordinate system or a laser radar coordinate system. A process of performing coordinate system conversion on the first point cloud data is specifically as follows: The origin of the coordinate system to which the first point cloud data belongs is moved to the rear axis center of the vehicle A. A coordinate system that uses the rear axis center of the vehicle as a circle center (in other words, a coordinate system to which third point cloud data belongs) is referred to as the first coordinate system. In this case, the process involves conversion between the laser radar coordinate system and the first coordinate system (for coordinate system conversion, refer to the foregoing content). In other words, for a point on a surface of an obstacle in the overlapping scanning area between the laser radar of the first vehicle and the laser radar of the second vehicle, a group of vectors corresponding to the point in the first point cloud data (the group of vectors may be referred to as point cloud data corresponding to the point in the first point cloud data) are multiplied by a preset first transformation matrix, to obtain a group of vectors corresponding to the point in the third point cloud data (the group of vectors may be referred to as point cloud data corresponding to the point in the third point cloud data). Because the laser radar of the vehicle A is fixed during installation, and the rear axle center of the vehicle is also determined, the first transformation matrix may also be determined.

Similarly, point cloud data obtained by the vehicle B through scanning is referred to as the second point cloud data, and a coordinate axis center of the second point cloud data is located on the laser radar of the vehicle B. In other words, the second point cloud data is data obtained in a second coordinate system of the second vehicle. Coordinate system conversion is performed on the second point cloud data, and the origin of the coordinate system to which the second point cloud data belongs is moved to the rear axis center of the vehicle B. A specific conversion process is similar to the foregoing content. It should be noted that a transformation matrix used in the process of performing coordinate system conversion between the second point cloud data and the fourth point cloud data is referred to as a second transformation matrix. The second transformation matrix is a transformation matrix corresponding to a linear transformation that needs to be performed on a center of the laser radar of the vehicle B relative to the rear axis center of the vehicle A by using the rear axis of the vehicle B as a reference. Because the laser radar of the vehicle A and the laser radar of the vehicle B may have different installation positions, the first transformation matrix and the second transformation matrix may also be different.

Further, a third transformation matrix between the second reference coordinate system and the first reference coordinate system is calculated based on the third point cloud data and the fourth point cloud data by using the first reference coordinate system as a reference. A manner of calculating a transformation matrix based on two pieces of point cloud data is described in detail in the following content.

In a possible implementation, alternatively, only one reference coordinate system (for example, may be the geodetic coordinate system, the UTM grid system, or the second coordinate system mentioned in the foregoing content) may be selected to separately convert the first point cloud data and the second point cloud data to the reference coordinate system instead of respectively setting two reference coordinate systems to convert the first point cloud data and the second point cloud data, and then point cloud matching is performed on the converted point cloud data, to determine a third transformation matrix obtained by using a point cloud matching result. A specific conversion process is similar to the foregoing method for obtaining the third point cloud data and the fourth point cloud data when the first vehicle and the second vehicle respectively select the reference coordinate systems. For brevity, details are not described herein again.

Manner 2: Select the first coordinate system as a reference coordinate system for performing coordinate conversion on the first point cloud data and the second point cloud data.

In Manner 2, a prerequisite is required. To be specific, the installation position of the laser radar of the first vehicle on the first vehicle is corresponding to the installation position of the laser radar of the second vehicle on the second vehicle. For example, the laser radar of the first vehicle is installed at a middle position of the vehicle roof of the first vehicle, and the laser radar of the second vehicle is installed at a middle position of the vehicle roof of the second vehicle. For another example, the laser radar of the first vehicle is installed at a position that is on the vehicle roof of the first vehicle and that is close to the vehicle head, and the laser radar of the second vehicle is installed at a position that is on the vehicle roof of the second vehicle and that is close to the vehicle head. For another example, the laser radar of the first vehicle is installed at a position that is on the vehicle roof of the first vehicle and that is close to the vehicle rear, and the laser radar of the second vehicle is installed at a position that is on the vehicle roof of the second vehicle and that is close to the vehicle rear.

In a possible implementation, a distance between the installation position of the laser radar of the first vehicle and the vehicle head of the first vehicle and a distance between the installation position of the laser radar of the second vehicle and the vehicle head of the second vehicle may be calculated. If the two distances each are less than a distance threshold, it may be determined that the installation position of the laser radar of the first vehicle on the first vehicle is corresponding to the installation position of the laser radar of the second vehicle on the second vehicle.

Further, in Manner 2, a third transformation matrix between the second reference coordinate system and the first reference coordinate system is calculated based on the first point cloud data and the second point cloud data by using the first reference coordinate system as a reference.

The following further describes a method for calculating a third transformation matrix based on two pieces of point cloud data. In this method, an example in which the third transformation matrix is calculated based on third point cloud data and fourth point cloud data is used for description. A process of performing point cloud matching on the third point cloud data and the fourth point cloud data may also be understood to solving, by using a first reference coordinate system to which the third point cloud data belongs as a reference, the third transformation matrix corresponding to a linear transformation that is performed for converting the fourth point cloud data from a second reference coordinate system to which the fourth point cloud data belongs to the first reference coordinate system. In other words, the point cloud matching process is a process of solving the third transformation matrix.

A relationship of performing point cloud matching on the third point cloud data and the fourth point cloud data may be expressed by using Formula (1):

$$T_{v_2} \Delta T_{v_1 v_2}' = T_{v_1} \qquad \text{Formula (1)}$$

In Formula (1), a number of the first vehicle is $v_1$, a number of the second vehicle is $v_2$, $\Delta T_{v_1 v_2}'$ is the third transformation matrix, $\Delta T_{v_1 v_2}'$ represents the first relative pose between the first vehicle and the second vehicle, $T_{v_1}$ is the third point cloud data, and $T_{v_2}$ is the fourth point cloud data.

The third transformation matrix in Formula (1) may be solved by using an iterative closest point (Iterative Closest Point, ICP) algorithm. The ICP algorithm is a process of solving a third transformation matrix through N iterations, where N is a positive integer. For each iteration process, a third transformation matrix used in the iteration process is obtained by multiplying a third transformation matrix that is output by a previous iteration by a preset transformation amount. For each of M points of an obstacle in the overlapping scanning area between the laser radar of the first vehicle and the laser radar of the second vehicle (the M points of the obstacle may be M points on a surface of the obstacle that is scanned by both the laser radar of the first vehicle and the laser radar of the second vehicle, where M is a positive integer), point cloud data corresponding to the point in the fourth point cloud data is multiplied by the third transformation matrix by using the point as a reference, to obtain transformed point cloud data corresponding to the point. The transformed point cloud data is referred to as fifth point cloud data. In this case, a residual between point cloud data corresponding to the point in the fifth point cloud data and the point cloud data corresponding to the point in the fourth point cloud data is calculated. Because two pieces of point cloud data are corresponding to two groups of vectors, calculating a residual (which may also be understood as an error) between the two pieces of point cloud data may be understood to solving a residual between the two groups of vectors, and solving the residual between the vectors may also be understood to solving a Euclidean metric (euclidean metric) (also referred to as a Euclidean distance) between the two groups of vectors.

For M residuals corresponding to the M points of the obstacle, a residual sum of the M points may be further calculated. If the residual sum is less than a preset residual threshold, it indicates that a current iteration result meets a requirement, and a third transformation matrix used in the current iteration process may be used as a finally solved third transformation matrix. If the residual sum does not meet the requirement, the third transformation matrix needs to be adjusted by using the preset transformation amount, and an adjusted third transformation matrix is used as a third transformation matrix in a next iteration process.

A process of performing point cloud matching by using the ICP algorithm may be represented by using Formula (2):

$$\Delta T'_{v_1 v_2} = \underset{\Delta T}{\operatorname{argmin}} \| T_{v_1} - T_{v_2} \Delta T \| \quad \text{Formula (2)}$$

In Formula (2), $v_1$ is the number of the first vehicle, $v_2$ is the number of the second vehicle, $\Delta T_{v_1 v_2}'$ is the finally solved third transformation matrix, $T_{v_1}$ is the third point cloud data, $T_{v_2}$ is the fourth point cloud data, and $\Delta T$ is an intermediate variable in a process of calculating A $T_{v_1 v_2}'$, that is, a third transformation matrix used in each iteration.

Figure 4:
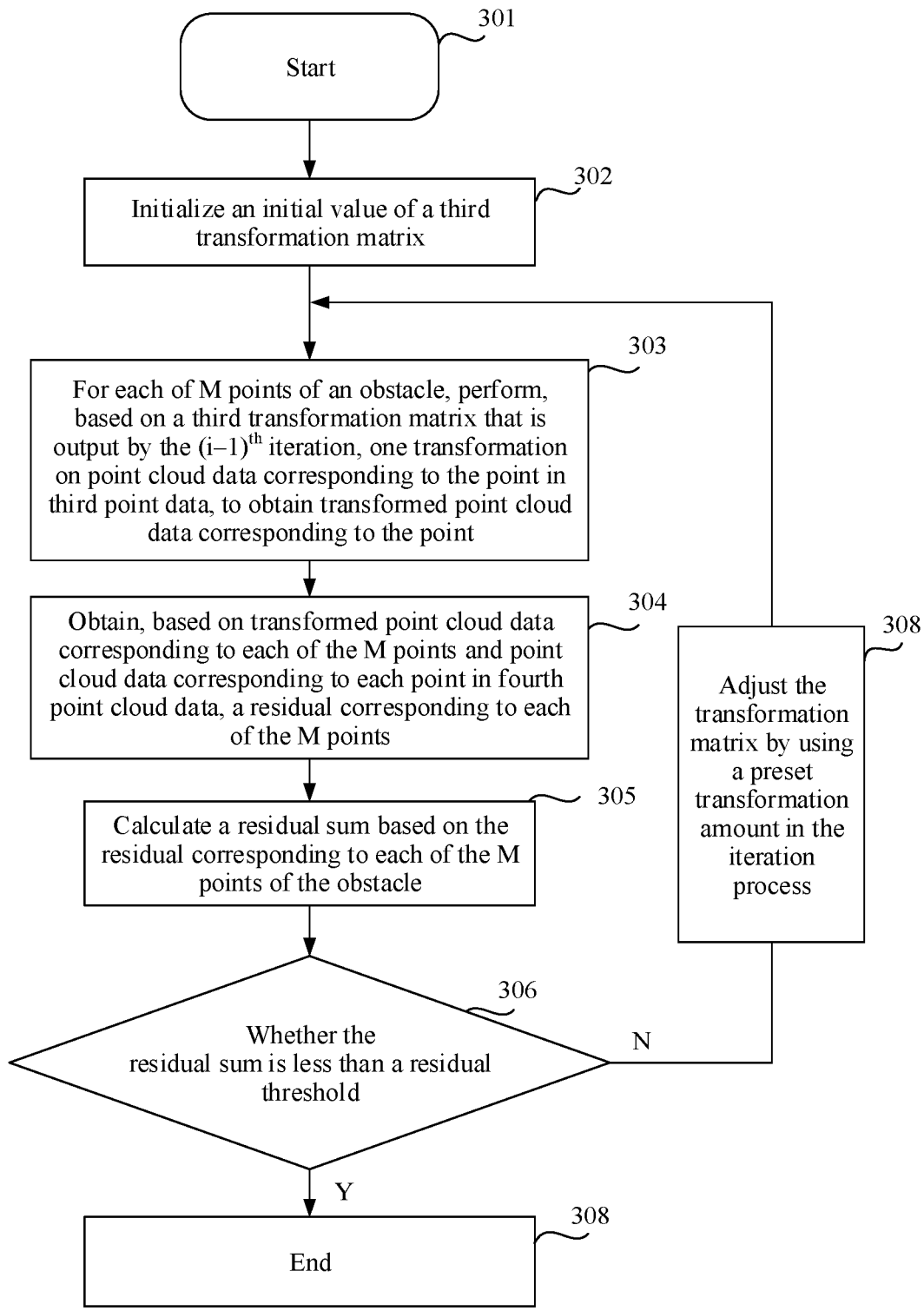
FIG. 4 is a schematic flowchart of a method for calculating a third transformation matrix according this application.

FIG. 4 is a schematic flowchart of a method for calculating the third transformation matrix in Formula (2) by using the ICP algorithm according to an embodiment of this application. As shown in FIG. 4, the method includes the following steps.

Step 301: Start.

Step 302: Initialize a third transformation matrix $\Delta T$, where $\Delta T$ is the third transformation matrix, and corresponding linear transformations are rotation and translation; or the third transformation matrix may be represented as a rotation matrix R and a translation matrix t. Step 302 may alternatively be initializing the rotation matrix R and the translation matrix t.

In step 302, in a possible implementation, initializing the third transformation matrix may be specifically: assigning an initial value of the third transformation matrix mentioned in the following content to $\Delta T$.

The initial value of the third transformation matrix may also be understood as a third transformation matrix used for performing the first iteration in the following content. To be specific, in N iterations mentioned in the following content, when i is 1, the initial value of the third transformation matrix may be a third transformation matrix that is output by the $(i-1)^{th}$ iteration.

In another possible implementation, initializing the third transformation matrix may be specifically: assigning a value to $\Delta T$. In a possible example, the rotation matrix R and the translation matrix t have the following values:

$$R = \begin{bmatrix} 1 & 0 & 0 \\ 0 & 1 & 0 \\ 0 & 0 & 1 \end{bmatrix}$$

$$t = \begin{bmatrix} 0 \\ 0 \\ 0 \end{bmatrix}$$

Next, the N iterations are performed, and the N iterations start from the first iteration. Step 303 to step 307 are the $i^{th}$ iteration, where i is a positive integer not greater than N.

Step 303: For each of M points of an obstacle, perform, based on the third transformation matrix that is output by the $(i-1)^{th}$ iteration, one transformation on point cloud data corresponding to the point in third point data, to obtain transformed point cloud data corresponding to the point, where M is a positive integer.

For each point xi in the M points of the obstacle, (Rxi+t) is calculated.

Herein, (Rxi+t) may also be written as (xi*$\Delta T$). In step 303, the point cloud data corresponding to the point in the third point cloud data is rotated and translated, to obtain the transformed point cloud data corresponding to the point.

Step 304: Obtain, based on transformed point cloud data corresponding to each of the M points and point cloud data corresponding to each point in the fourth point cloud data, a residual corresponding to each of the M points.

In step 304, the point cloud data corresponding to the point in the fourth point cloud data may be determined in the following manner.

For a piece of point cloud data in the fourth point cloud data, if the point cloud data and transformed point cloud data corresponding to the point meet the following condition, it is determined that the point cloud data is the point cloud data corresponding to the point in the fourth point cloud data. The condition includes: a corresponding distance between the transformed point cloud data corresponding to the point and the point cloud data is less than a preset distance threshold. The corresponding distance between the two pieces of point cloud data may be a Euclidean metric, and may be a real distance between two points in multi-dimensional (two-dimensional or more-than-two-dimensional) space. A Euclidean distance in two-dimensional or three-dimensional space is an actual distance between two points.

For each of the M points, the corresponding distance between the transformed point cloud data corresponding to the point and the point cloud data corresponding to the point in the fourth point cloud data is calculated, and may be used as the residual corresponding to the point.

Step 305: Calculate a residual sum based on the residual corresponding to each of the M points of the obstacle.

Step 306: Determine whether the residual sum is less than a residual threshold, and if not, perform step 307, or if yes, perform step 308.

In step 306, the residual threshold may be a preset value, for example, may be $10^{-10}$.

Step 307: When it is determined that a quantity of iterations is not greater than an iteration quantity threshold, update, by using a preset transformation amount, the third transformation matrix that is output by the $(i-1)^{th}$ iteration, and use an updated third transformation matrix that is output by the $(i-1)^{th}$ iteration as a third transformation matrix that is output by the $i^{th}$ iteration, to perform a next iteration, so as to repeat step 303 to enter a next iteration.

In step 307, the iteration quantity threshold is set, and if the quantity of iterations is greater than the iteration quantity threshold, the process ends and no iteration is performed. The iteration quantity thresholds may be a preset value, so as to prevent the quantity of iterations from being excessively large.

In step 307, the preset transformation amount may include a preset rotation step and a preset translation step, and may be calculated by using a Gauss-Newton iteration method.

Step 308: If the residual sum is less than the residual threshold, end the iteration, and use the third transformation matrix that is output by the $(i-1)^{th}$ iteration as a third transformation matrix that is output by the $N^{th}$ iteration.

In a possible implementation, the third transformation matrix that is output by the $N^{th}$ iteration is used as a mathematical expression of a first relative pose. In other words, the third transformation matrix that is output by the $N^{th}$ iteration may be used as a mathematical expression of the first relative pose in this embodiment of this application. In this embodiment of this application, the first relative pose is a position and a posture of a second vehicle relative to a first vehicle by using the first vehicle as a reference, and the position and the posture may be represented by using the third transformation matrix that is output by the $N^{th}$ iteration. That the first relative pose is expressed by using a transformation matrix (for example, the third transformation matrix that is output by the $N^{th}$ iteration, or a fourth transformation matrix mentioned in the following content) is merely a possible implementation. In a specific embodiment, the first relative pose may alternatively be expressed by using another mathematical expression, for example, a quaternion, an axis angle, or an Euler angle.

The third point cloud data and the fourth point cloud data used in the iteration process of the ICP algorithm are obtained by performing coordinate system conversion on first point cloud data and second point cloud data. Therefore, it needs to be ensured that the first point cloud data and the second point cloud data are data collected by two laser radars at a same moment. To ensure this requirement, a wireless clock source of the first vehicle may be set as a reference to adjust a clock of the second vehicle, so that the clocks of the first vehicle and the second vehicle are synchronized. Both the first point cloud data and the second point cloud data carry respective timestamps. The timestamp may be represented by using a plurality of methods. The timestamp may be an incremental value between a current time and a preset time. The preset time may be specified, for example, 2020 Dec. 31 00:00:00.

During specific implementation, when the first vehicle is relatively far away from the second vehicle, the quantity of iterations in the ICP algorithm may be excessively large, and a local extremum is likely to occur. To resolve this problem, in this embodiment of this application, an initial value of the third transformation matrix may be provided for the iterations in the ICP algorithm. In other words, an initial value may be provided for point cloud matching. The initial value of the third transformation matrix may also be referred to as the third transformation matrix that is output by the $(i-1)^{th}$ iteration when i is 1 in the foregoing content. In other words, the initial value of the third transformation matrix may also be referred to as a third transformation matrix that is output by the $0^{th}$ iteration. The iteration process starts from the first iteration.

The following describes a solution for determining the initial value of the third transformation matrix.

The initial value of the third transformation matrix provided in this embodiment of this application may be determined based on an estimated global pose of the first vehicle and a global pose of the second vehicle. Because a GPS of the second vehicle is not damaged, the global pose of the second vehicle is relatively accurate. However, a GPS of the first vehicle is faulty. In this embodiment of this application, the estimated global pose of the first vehicle is estimated based on another solution (the following content describes a manner of calculating the estimated global pose of the first vehicle), and the value is estimated. In this case, accuracy is lower than that of the global pose of the second vehicle. A second relative pose is determined based on an estimated global pose of the first vehicle at a current moment and a global pose of the second vehicle at the current moment. The second relative pose is used to indicate a position and a posture of a help providing object relative to the first vehicle by using the first vehicle as a reference, and the second relative pose is a pose of the help providing object that is determined in a first coordinate system. A matrix used to express the second relative pose is used as the third transformation matrix that is output by the $(i-1)^{th}$ iteration. In other words, the matrix used to express the second relative pose is used as the initial value of the third transformation matrix. Accuracy of the calculated initial value of the third transformation matrix is not high, but is relatively close to the third matrix that is output by the $N^{th}$ iteration (the third matrix that is output by the $N^{th}$ iteration may be referred to as an optimal solution). Therefore, performing an iteration in the ICP algorithm based on the initial value of the third transformation matrix is similar to finding the optimal solution based on a solution close to the optimal solution.

This can obviously narrow a search range for finding the optimal solution, and can obviously reduce the quantity of iterations, thereby greatly improving a speed and precision of algorithm convergence.

It should be noted that the optimal solution in this embodiment of this application is one of basic concepts of mathematical planning, and means a feasible solution that minimizes an objective function (maximizes a maximization problem) during mathematical planning. The feasible solution that minimizes the objective function is referred to as a minimum solution, and the feasible solution that maximizes the objective function is referred to as a maximum solution. Either the minimum solution or the maximum solution is referred to as an optimal solution. Correspondingly, the minimum value or the maximum value of the objective function is referred to as an optimal value. Sometimes, the optimal solution and the optimal value are together referred to as an optimal solution during corresponding mathematical planning. The objective function herein means Formula (2), and a process of solving Formula (2) may be understood to solving the optimal solution of the third matrix.

The estimated global pose of the first vehicle at the current moment may be calculated based on a global pose of the first vehicle at a previous moment and a pose of the first vehicle at the current moment relative to the previous moment that is calculated based on an IMU by using the global pose of the first vehicle at the previous moment as a reference. The following provides details.

Manner a1: The global pose of the first vehicle at the previous moment may be a latest valid GPS-based global pose that is recorded by a system.

In a possible implementation, when the GPS is invalid (for example, an error of the GPS-based global pose is greater than an error threshold, or the GPS positioning apparatus is faulty), the system records the latest valid GPS-based global pose (the latest valid GPS-based global pose of the first vehicle may also be referred to as a GPS-based global pose of the first vehicle on a previous frame). In Manner a1, a moment of recording the latest valid GPS-based global pose by the system is referred to as a first moment. The estimated global pose of the first vehicle at the current moment is obtained based on the following content: the GPS-based global pose of the first vehicle on the previous frame, and a relative pose between a pose of the first vehicle at the current moment and a pose of the first vehicle at the first moment.

A relative pose of a vehicle within a time period is calculated by using a plurality of methods, for example, based on a wheel odometer, a visual odometer, or an inertia measurement unit. Generally, a relative pose within a time period may be calculated by using a data pre-integration method. For ease of description, the IMU method is used as an example below.

In Manner a1, a pose change amount of the first vehicle within a time period from the first moment to the current moment (which may also be referred to as the relative pose between the pose of the first vehicle at the current moment and the pose of the first vehicle at the first moment) may be calculated based on the IMU. The global pose of the first vehicle at the current moment may be obtained with reference to a GPS-based global pose of the first vehicle at the first moment and the relative pose that is calculated based on the IMU from the first moment to the current moment.

In Manner a1, the estimated global pose of the first vehicle at the current moment $$T'_{v_1} = T_{v_{1last}} * \Delta T_{v_1} \qquad \text{Formula (3)}$$

In Formula (3), $v_1$ is a number of the first vehicle, $v_2$ is a number of the second vehicle, $$T_{v_{1last}}$$

is the GPS-based global pose of the first vehicle at the first moment, $\Delta T_{v_1}$ is a pose change amount of the current moment that is relative to the first moment and that is calculated based on the IMU by using the first moment as a reference, and may also be referred to as the relative pose between the pose of the first vehicle at the current moment and the pose of the first vehicle at the first moment, and $T'_{v_1}$ is the estimated global pose of the first vehicle at the current moment.

Formula (3) may also be understood as that the relative pose $\Delta T_{v_1}$ between the global pose of the first vehicle at the current moment and the global pose of the first vehicle at the first moment is calculated based on the IMU, and the estimated global pose $T'_{v_1}$ of the first vehicle at the current moment may be calculated by using the GPS-based global pose $$T_{v_{1last}}$$

of the first vehicle at the first moment and the relative pose $\Delta T_{v_1}$.

In Manner a1, the second vehicle obtains the global pose at the current moment based on the GPS and the IMU. The GPS of the second vehicle is not invalid, but the global pose of the second vehicle that is obtained based on the GPS is delayed to some extent. Therefore, when the second vehicle is positioned based on the GPS, information obtained based on the GPS and information obtained based on another technology (for example, the IMU) may be fused, and a fusion result is used as the global pose of the second vehicle at the current moment. The manner of fusing the information obtained based on the GPS and the information obtained based on the another technology (for example, the IMU) to implement positioning may be referred to as integrated positioning. To be specific, a moment at which a latest GPS-based global pose of the second vehicle is received is first determined, then a possible traveling distance of the second vehicle within a time period from the moment at which the latest GPS-based global pose of the second vehicle is received to the current moment is calculated based on the IMU, and the global pose of the second vehicle at the current moment is determined with reference to the moment and the distance.

In Manner a1, the initial value of the third transformation matrix for the first vehicle and the second vehicle may be calculated by using Formula (4):

$$\Delta T_{v_1 v_2}'' = T_{v_2}{}^T T'_{v_1} \qquad \text{Formula (4)}$$

In Formula (4), $v_1$ is the number of the first vehicle, $v_2$ is the number of the second vehicle, $T'_{v_1}$ is the estimated global pose of the first vehicle at the current moment, $T_{v_2}$ is the global pose of the second vehicle at the current moment, and $\Delta T_{v_1 v_2}''$ is the initial value of the third transformation matrix, and may also be described as an initial value of the pose change amount of the second vehicle relative to the first vehicle by using the first vehicle as a reference.

Figure 5:
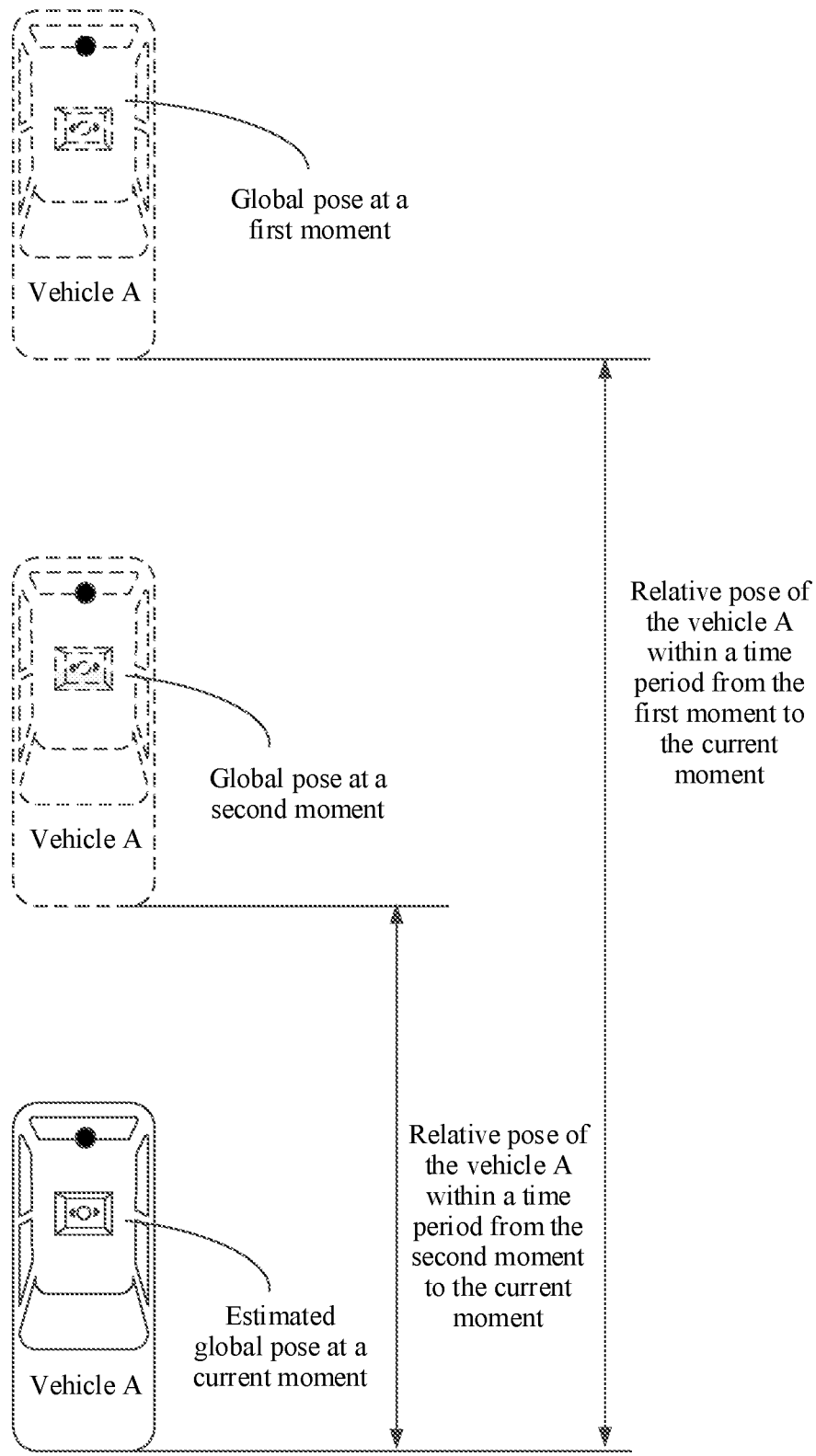
FIG. 5 is a schematic diagram of a calculation process of estimating a global pose of a vehicle according to this application.

FIG. 5 is a schematic diagram of an example of calculating an estimated global pose of the vehicle A in FIG. 1 at the current moment. As shown in FIG. 5, for example, the vehicle A is the first vehicle. The estimated global pose of the vehicle A at the current moment may be determined based on a global pose of the vehicle A at the first moment and a relative pose of the vehicle A within the time period from the first moment to the current moment. As shown in FIG. 5, the global pose of the vehicle A at the first moment may be $$T_{v_{1last}}$$

in Formula (3). The relative pose of the vehicle A within the time period from the first moment to the current moment may be $\Delta T_{v_1}$ in Formula (3).

Manner a2: The global pose of the first vehicle at the previous moment may be a latest global pose of the first vehicle that is obtained by using the method provided in FIG. 3.

In Manner a2, in a possible implementation, before a current global pose of the first vehicle is calculated, one global pose of the first vehicle is at determined at least according to the solution provided in step 310 to step 313. In Manner a2, a moment of calculating the latest global pose of the first vehicle is a second moment. In this case, in an optional implementation, the estimated global pose of the first vehicle at the current moment is obtained based on the following content: a pose change amount of the first vehicle at the current moment relative to the second moment by using the calculated latest global pose of the first vehicle (that is, a global pose of the first vehicle at the second moment) as a reference, that is, a relative pose of the first vehicle between the second moment and the current moment.

In Manner a2, a manner in which the second vehicle obtains the global pose at the current moment is the same as Manner a1. Details are not described again. In addition, the initial value of the third transformation matrix for the first vehicle and the second vehicle may be calculated based on the estimated global pose of the first vehicle at the current moment and the global pose of the second vehicle at the current moment by using Formula (4). Details are not described again.

FIG. 5 is a schematic diagram of an example of calculating an estimated global pose of the vehicle A in FIG. 1 at the current moment. As shown in FIG. 5, for example, the vehicle A is the first vehicle. The estimated global pose of the vehicle A at the current moment may be determined based on a global pose of the vehicle A at the second moment and a relative pose of the vehicle A within the time period from the second moment to the current moment. As shown in FIG. 5, the global pose of the vehicle A at the second moment may be one global pose of the first vehicle that is determined according to the solution provided in step 311 to step 313. The relative pose of the vehicle A within the time period from the second moment to the current moment may be obtained based on the following content: the global pose of the first vehicle at the previous moment and the IMU.

It should be noted that, for selection occasions of Manner a1 and Manner a2, Manner a1 and Manner a2 may be flexibly selected. This embodiment of this application provides a possible implementation. When the solution provided in FIG. 2 is used to calculate the global pose of the first vehicle for the first time after the GPS of the first vehicle is faulty, the initial value of the third transformation matrix for the first vehicle and the second vehicle may be calculated in Manner a1. When the solution provided in FIG. 2 is used to calculate the global pose of the first vehicle after the first time, the initial value of the third transformation matrix for the first vehicle and the second vehicle is calculated in Manner a2.

In a possible implementation, the third transformation matrix that is output by the $N^{th}$ iteration is used as a mathematical expression of a first relative pose. In another possible implementation, weighted fusion is performed on the initial value of the third transformation matrix and the third transformation matrix that is output by the $N^{th}$ iteration, to obtain the fourth transformation matrix, and the fourth transformation matrix is used as a mathematical expression of the first relative pose. The weighted fusion may be Kalman filtering fusion.

In a process of performing Kalman filtering fusion on the third transformation matrix that is output by the $N^{th}$ iteration and the initial value of the third transformation matrix, weights respectively corresponding to the third transformation matrix that is output by the $N^{th}$ iteration and the initial value of the third transformation matrix are determined, and then weighted addition is performed on the third transformation matrix that is output by the $N^{th}$ iteration and the initial value of the third transformation matrix, to obtain the fourth transformation matrix. The fourth transformation matrix is used as a mathematical expression of the first relative pose. The weight of the third transformation matrix that is output by the $N^{th}$ iteration is related to a trustworthiness level of the third transformation matrix, and the weight of the initial value of the third transformation matrix is related to a trustworthiness level of the initial value of the third transformation matrix. Because the initial value of the third transformation matrix is determined based on the estimated global pose of the first vehicle, the trustworthiness level is relatively low. However, the trustworthiness level of the third transformation matrix that is output by the $N^{th}$ iteration is relatively high. Based on this, the first relative pose may be set as an observation model for Kalman filtering fusion (a trustworthiness level of the observation model is relatively high), and the initial value of the third transformation matrix is set as a prediction model for Kalman filtering fusion (a trustworthiness level of the prediction model is relatively low).

The global pose of the first vehicle may be determined by using Formula (5):

$$T_{v_1} = T_{v_2} * \Delta T_{v_1 v_2} \quad \text{Formula (5)}$$

In Formula (5), $v_1$ is the number of the first vehicle, $v_2$ is the number of the second vehicle, $T_{v_1}$ is the global pose of the first vehicle, $T_{v_2}$ is the global pose of the second vehicle at the current moment, and $\Delta T_{v_1 v_2}$ is the first relative pose.

The foregoing solution describes a solution in which the help providing object is the second vehicle, and the laser radars installed on the first vehicle and the second vehicle are used to assist in determining the first relative pose between the first vehicle and the second vehicle. The following describes several other solutions for determining the first relative pose between the first vehicle and the help providing object.

In a possible embodiment, a controller for implementing vehicle may alternatively be deployed on the help providing object in addition to being deployed on the first vehicle. In this case, a difference from the solution shown in FIG. 2 lies in that the controller may directly obtain the global pose of the help providing object without a need of performing step 312. In addition, after determining the global pose of the first vehicle, the controller further needs to send the global pose of the first vehicle to the first vehicle. In this implementation, because a server is deployed on the help providing object, a calculation workload of the first vehicle can be reduced, in other words, a calculation burden of a faulty vehicle can be reduced.

In another possible embodiment, a controller for implementing vehicle positioning may alternatively be deployed on a cloud. In this case, a difference from the solution shown in FIG. 2 lies in that the help providing object may send the global pose of the help providing object to the controller on the cloud after receiving the first request in step 310. In another possible implementation, the first vehicle may send the first request to the controller on the cloud, the controller that is deployed on the cloud sends the first request to the help providing object, and then the help providing may send the global pose of the help providing to the controller on the cloud. In this implementation, after calculating the global pose of the first vehicle, the controller needs to send the global pose of the first vehicle to the first vehicle. In this implementation, because a server is deployed on the cloud, a calculation load of the first vehicle or the second vehicle can be reduced, and a burden of the first vehicle or the second vehicle is reduced.

In another possible implementation, in the method in FIG. 2, the help providing object may be the second vehicle, and cameras may also be installed on the first vehicle and the second vehicle in addition to the laser radars. A camera sensor may be a panoramic camera sensor. The first vehicle may continuously photograph two frames of first images by using a camera sensor. Each image is an image in a two-dimensional coordinate system (for example, an X/Y coordinate system), and a feature point in the image is corresponding to X-axis and Y-axis coordinates. Depth information, namely, a Z-axis coordinate, of the feature point in the first image may be determined with reference to the two frames of first images. In other words, the first vehicle may obtain X-axis, Y-axis, and Z-axis coordinates of a feature point of an obstacle by using the camera sensor. The X-axis, Y-axis, and Z-axis coordinates of the feature point form a group of vectors. In this case, point cloud data corresponding to the point is obtained. It can be learned that the camera sensor of the first vehicle may also obtain point cloud data corresponding to the first image. Similarly, the camera sensor of the second vehicle obtains point cloud data corresponding to a second image. The camera sensor of the first vehicle and the camera sensor of the second vehicle have an overlapping photographing area. Therefore, point cloud matching may be performed based on point cloud data corresponding to a feature point of an obstacle in the overlapping area in the point cloud data of the first image and point cloud data corresponding to the feature point in the point cloud data of the second image, to determine the first relative pose between the first vehicle and the second vehicle. For a solution of performing point cloud matching with reference to two pieces of point cloud data to determine the first relative pose, refer to the foregoing content. Details are not described herein again. Further, the global pose of the first vehicle is determined based on the first relative pose and the global pose of the second vehicle.

In another possible implementation, the help providing object may be an infrastructure provided with a communications module, for example, a street lamp provided with a communications module mentioned in the foregoing content, or may be a roadside base station, or may be a camera provided with a communications module.

When the help providing object is a street lamp provided with a communications module or a base station, for example, when the help providing object is a street lamp, the first vehicle may receive a signal sent by the street lamp, and may determine a relative position between the street lamp and the first vehicle based on strength of the signal. The street lamp may send a global position of the street lamp to the vehicle, and then the first vehicle may determine a position of the first vehicle based on the relative position and a position of the street lamp. In addition, the first vehicle may estimate a posture of the first vehicle, for example, calculate a posture of the first vehicle at a current moment based on based on a posture of the first vehicle at a previous moment and a posture of the first vehicle at the current moment relative to the previous moment that is calculated based on an IMU by using the posture of the first vehicle at the previous moment as a reference.

When the help providing object is a camera provided with a communications module, the camera may photograph two frames of third images including the first vehicle. Each image is an image in a two-dimensional coordinate system (for example, an X/Y coordinate system), and a feature point of the first vehicle in the image is corresponding to X-axis and Y-axis coordinates. Depth information, namely, a Z-axis coordinate, of the feature point of the first vehicle in the third image may be determined with reference to the two frames of third images. The X-axis, Y-axis, and Z-axis coordinates of the feature point of the first vehicle may represent global posture information of the first vehicle.

The foregoing describes in detail the vehicle positioning method provided in embodiments of this application with reference to FIG. 1 to FIG. 5. The following describes a vehicle position controller and system provided in embodiments of this application with reference to FIG. 6 and FIG. 7.

Figure 6:
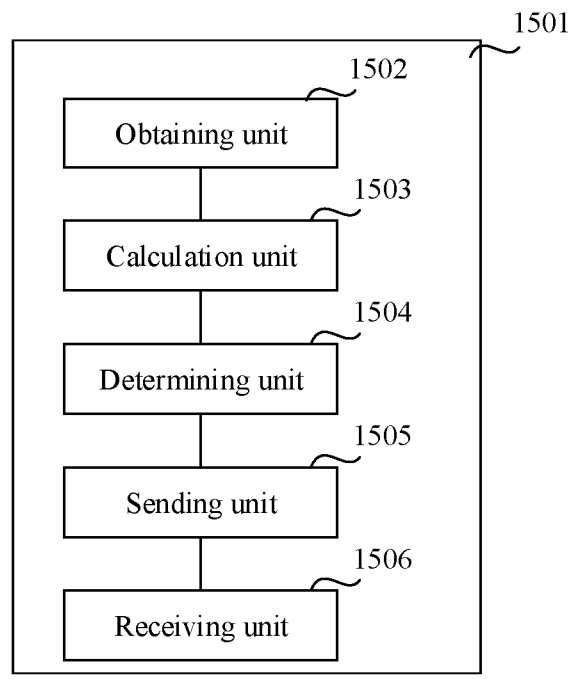
FIG. 6 is a schematic diagram of a structure of a vehicle positioning apparatus according to this application.

FIG. 6 is a schematic diagram of a structure of a vehicle positioning apparatus according to an embodiment of this application. As shown in the figure, the apparatus 1501 includes an obtaining unit 1502 and a calculation unit 1503.

The obtaining unit 1502 is configured to: obtain a first relative pose between a first vehicle and a help providing object, and obtain a global pose of the help providing object. The first relative pose is used to indicate a position and a posture of the help providing object relative to the first vehicle by using the first vehicle as a reference, the first relative pose is a pose of the help providing object that is determined in a first coordinate system, and the global pose is a global pose of the help providing object that is determined in a second coordinate system.

The calculation unit 1503 is configured to calculate a global pose of the first vehicle based on the first relative pose and the global pose. In this way, when a GPS signal of the first vehicle is weak or there is no GPS signal, the global pose of the first vehicle may be determined based on the global pose of the help providing object and the first relative pose between the first vehicle and the help providing object.

It should be understood that the apparatus 1501 in this embodiment of this application may be implemented by using an application-specific integrated circuit (application-specific integrated circuit, ASIC), or may be implemented by using a programmable logic device (programmable logic device, PLD). The PLD may be a complex programmable logic device (complex programmable logic device, CPLD), a field-programmable gate array (field-programmable gate array, FPGA), generic array logic (generic array logic, GAL), or any combination thereof. Alternatively, when the vehicle positioning method shown in FIG. 2 to FIG. 5 may be implemented by using software, the apparatus 1501 and the modules of the apparatus 1501 may also be software modules.

In a possible implementation, the help providing object is a second vehicle, the first relative pose is used to indicate a position and a posture of the second vehicle relative to the first vehicle by using the first vehicle as a reference, and the posture is used to indicate a vehicle head orientation of the second vehicle by using a vehicle head orientation of the first vehicle as a reference. In this way, when a GPS signal of the first vehicle is weak or there is no GPS signal, the first vehicle may seek help from another vehicle, and the vehicle head orientation of the first vehicle may be determined based on information about the another vehicle, so that the first vehicle can be assisted in implementing autonomous driving in the intelligent vehicle field.

In another possible implementation, the obtaining unit 1502 is further configured to: obtain first point cloud data in the first coordinate system that is obtained by a laser radar of the first vehicle by scanning an object around the first vehicle; obtain second point cloud data in the second coordinate system that is obtained by a laser radar of the second vehicle by scanning an object around the second vehicle, where the laser radar of the first vehicle and the laser radar of the second vehicle have an overlapping scanning area, and for an obstacle in the overlapping scanning area, the first point cloud data includes point cloud data corresponding to the obstacle, and the second point cloud data includes point cloud data corresponding to the obstacle; and calculate the first relative pose based on the point cloud data corresponding to the obstacle in the first point cloud data and the point cloud data corresponding to the obstacle in the second point cloud data. In this way, point cloud matching may be performed based on the point cloud data obtained by the laser radars through scanning, so that a relatively accurate relative pose between the two vehicles is determined.

In another possible implementation, the obtaining unit 1502 is further configured to: convert the first point cloud data in the first coordinate system to a preset first reference coordinate system of the first vehicle, to obtain third point cloud data, where the first reference coordinate system is a coordinate system obtained after an origin of the first coordinate system is translated to a preset first reference point; convert the second point cloud data in the second coordinate system to a preset second reference coordinate system of the second vehicle, to obtain fourth point cloud data, where the second reference coordinate system is a coordinate system obtained after an origin of the second coordinate system is translated to a preset second reference point; and perform point cloud matching on point cloud data corresponding to the obstacle in the third point cloud data and point cloud data corresponding to the obstacle in the fourth point cloud data, to obtain the first relative pose. In this way, the first point cloud data and the second point cloud data each may be converted to the reference coordinate system of the respective vehicle, and the origin point of the reference coordinate system of each vehicle is corresponding to the position of the vehicle. For example, the origin of the reference coordinate system of each vehicle is located at a rear axle center of the vehicle, so that a relatively accurate relative pose between the two vehicles can be determined.

In a possible implementation, the obtaining unit 1502 is further configured to: perform N iterations based on the point cloud data corresponding to the obstacle in the third point cloud data and the point cloud data corresponding to the obstacle in the fourth point cloud data, to obtain a third transformation matrix that is output by the $N^{th}$ iteration, where N is a positive integer; and determine the first relative pose based on the third transformation matrix that is output by the $N^{th}$ iteration. For the $i^{th}$ iteration in the N iterations, i is a positive integer not greater than N, and the following operations are performed for each of M points of the obstacle: performing, based on a third transformation matrix that is output by the $(i-1)^{th}$ iteration, one transformation on point cloud data corresponding to the point in the third point cloud data, to obtain transformed point cloud data corresponding to the point, and calculating a difference between the transformed point cloud data corresponding to the point and point cloud data corresponding to the point in the fourth point cloud data, to obtain a residual corresponding to the point, where M is a positive integer; calculating a residual sum based on a residual corresponding to each of the M points of the obstacle; and if the residual sum is not less than a preset residual threshold, updating, by using a preset transformation amount, the third transformation matrix that is output by the $(i-1)^{th}$ iteration, and using an updated third transformation matrix that is output by the $(i-1)^{th}$ iteration as a third transformation matrix that is output by the $i^{th}$ iteration, to perform a next iteration; or if the residual sum is less than the residual threshold, ending the iteration, and using the third transformation matrix that is output by the $(i-1)^{th}$ iteration as the third transformation matrix that is output by the Nth iteration.

In a possible implementation, the obtaining unit 1502 is further configured to: when i is 1, determine, based on the following content, the third transformation matrix that is output by the $(i-1)^{th}$ iteration: calculating an estimated global pose of the first vehicle at a current moment based on a global pose of the first vehicle at a previous moment and a pose of the first vehicle at the current moment relative to the previous moment that is calculated based on an IMU by using the global pose of the first vehicle at the previous moment as a reference; obtaining a global pose of the second vehicle at the current moment based on a global positioning system GPS and an IMU; determining a second relative pose based on the estimated global pose of the first vehicle at the current moment and the global pose of the second vehicle at the current moment, where the second relative pose is used to indicate a position and a posture of the help providing object relative to the first vehicle by using the first vehicle as a reference, and the second relative pose is a pose of the help providing object that is determined in the first coordinate system; and using a matrix used to express the second relative pose as the third transformation matrix that is output by the $(i-1)^{th}$ iteration.

In a possible implementation, the obtaining unit 1502 is further configured to: for the third transformation matrix that is output by the $(i-1)^{th}$ iteration, use the third transformation matrix that is output by the $N^{th}$ iteration as a mathematical expression of the first relative pose. In another possible implementation, the obtaining unit 1502 is further configured to: perform weighted fusion on the third transformation matrix that is output by the $(i-1)^{th}$ iteration and the third transformation matrix that is output by the $N^{th}$ iteration, to obtain a fourth transformation matrix, and use the fourth transformation matrix as a mathematical expression of the first relative pose.

In a possible implementation, the apparatus 1501 further includes a determining unit 1504, configured to determine that an error of a GPS-based global pose of the first vehicle is greater than an error threshold, or a GPS positioning apparatus on the first vehicle is faulty.

In a possible implementation, the obtaining unit 1502 is further configured to obtain a global pose of a first vehicle corresponding to each of a plurality of help providing objects; and the calculation unit 1503 is further configured to perform weighted fusion on global poses of a plurality of first vehicles corresponding to the plurality of help providing objects, to obtain a target global pose of the first vehicle.

The apparatus 1501 further includes a sending unit 1505 and a receiving unit 1506. The sending unit 1505 is configured to send a first request to the help providing object. The first request carries an identifier of the first vehicle. The receiving unit 1506 is configured to receive the global pose of the help providing object that is sent by the help providing object.

The apparatus 1501 in this embodiment of this application may correspondingly perform the method described in embodiments of this application. In addition, the foregoing and other operations and/or functions of the units in the apparatus 1501 are respectively used to implement corresponding procedures of the method in FIG. 2 to FIG. 5. For brevity, details are not described herein again.

Figure 7:
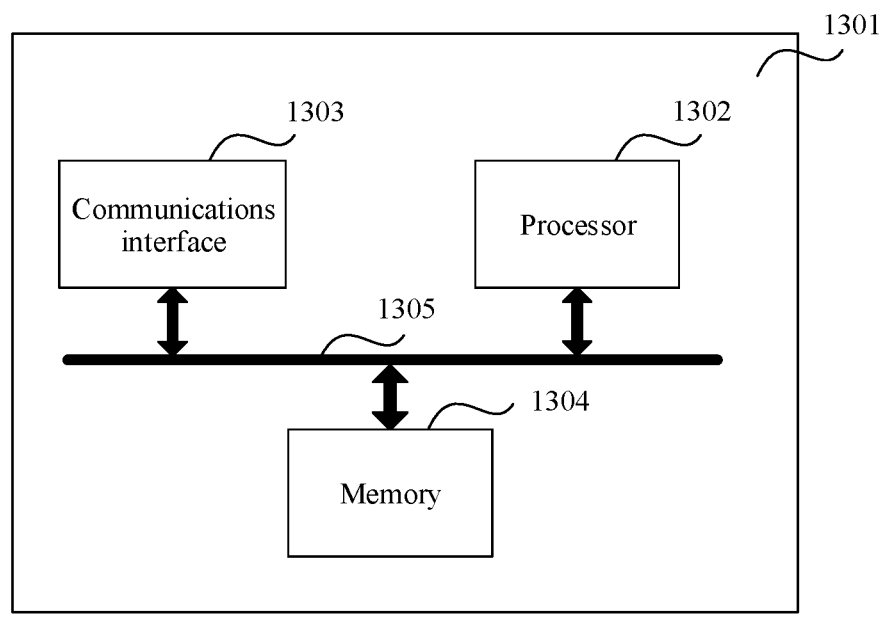
FIG. 7 is a schematic diagram of a structure of another vehicle positioning apparatus according to this application.

FIG. 7 is a schematic diagram of a structure of a controller according to an embodiment of this application. As shown in the figure, the controller 1301 includes a processor 1302, a memory 1304, and a communications interface 1303. The processor 1302, the memory 1304, and the communications interface 1303 may communicate with each other through a bus 1305, or may communicate with each other in another manner, for example, through wireless transmission. The memory 1304 is configured to store instructions, and the processor 1302 is configured to execute the instructions stored in the memory 1304. The memory 1304 stores program code, and the processor 1302 may invoke the program code stored in the memory 1304 to perform the following operations.

The processor 1302 is configured to: obtain a first relative pose between a first vehicle and a help providing object, and obtain a global pose of the help providing object. The first relative pose is used to indicate a position and a posture of the help providing object relative to the first vehicle by using the first vehicle as a reference, the first relative pose is a pose of the help providing object that is determined in a first coordinate system, and the global pose is a global pose of the help providing object that is determined in a second coordinate system. The processor 1302 is configured to calculate a global pose of the first vehicle based on the first relative pose and the global pose. In this way, when a GPS signal of the first vehicle is weak or there is no GPS signal, the global pose of the first vehicle may be determined based on the global pose of the help providing object and the first relative pose between the first vehicle and the help providing object.

It should be understood that in this embodiment of this application, the processor 1302 may be a central processing unit (central processing unit, CPU), or the processor 1302 may be another general-purpose processor, a digital signal processor (digital signal processor, DSP), an application-specific integrated circuit (ASIC), a field-programmable gate array (FPGA) or another programmable logic device, a discrete gate or transistor logic device, a discrete hardware component, or the like. The general-purpose processor may be a microprocessor, any conventional processor, or the like.

The memory 1304 may include a read-only memory and a random access memory, and provide instructions and data for the processor 1302. The memory 1304 may further include a nonvolatile random access memory. For example, the memory 1304 may further store information of a storage device type.

The memory 1304 may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. Through example but not limitative description, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

In addition to a data bus, the bus 1305 may further include a power bus, a control bus, a status signal bus, and the like. However, for clear description, all buses are expressed as the bus 1305 in the figure.

It should be understood that the vehicle positioning controller 1301 according to this embodiment of this application may be corresponding to the vehicle positioning apparatus 1501 in this embodiment of this application, and may be corresponding to a corresponding body in the method according to embodiments of this application. In addition, the foregoing and other operations and/or functions of the modules in the controller 1301 are respectively intended to implement corresponding procedures of the method in FIG. 2 to FIG. 5. For brevity, details are not described herein again.

This application further provides a vehicle. The vehicle includes the controller 1301 shown in FIG. 7. The vehicle may be corresponding to the first vehicle in the method shown in FIG. 2, and is configured to implement the operation steps of the method in FIG. 2 to FIG. 5. For brevity, details are not described herein again.

This application further provides a vehicle. The vehicle includes the controller 1301 shown in FIG. 7. In this case, the vehicle may be a help providing vehicle, and is configured to perform the operation steps of the method shown in FIG. 2 to FIG. 5, to implement a process of assisting a vehicle whose GPS is faulty in positioning.

This application further provides a system. The system includes a first vehicle and a cloud computing platform. The cloud computing platform is configured to implement a process in which the cloud computing platform assists the first vehicle whose GPS is faulty in positioning in the foregoing method.

All or some of embodiments may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on a computer, procedures or functions according to embodiments of this application are all or partially generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid state drive (solid state disc, SSD)), or the like.

The foregoing descriptions are merely specific implementations of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A vehicle positioning method, comprising:
    obtaining, by a first vehicle, a first relative pose between the first vehicle and a help providing object based on first point cloud data in a first coordinate system and second point cloud data in a second coordinate system, wherein the first relative pose is used to indicate a position and a posture of the help providing object relative to the first vehicle by using the first vehicle as a reference, and the first relative pose is a pose of the help providing object that is determined in the first coordinate system;
    receiving, by the first vehicle from the help providing object, a global pose of the help providing object, wherein the global pose of the help providing object is determined in the second coordinate system; and
    calculating, by the first vehicle, a global pose of the first vehicle based on the first relative pose and the global pose of the help providing object.

2. The method according to claim 1, wherein the help providing object comprises a second vehicle, the first relative pose is used to indicate a position and a posture of the second vehicle relative to the first vehicle by using the first vehicle as a reference, and the posture of the second vehicle is used to indicate a vehicle head orientation of the second vehicle by using a vehicle head orientation of the first vehicle as a reference.

3. The method according to claim 2, wherein the obtaining the first relative pose between the first vehicle and the help providing object comprises:
    obtaining the first point cloud data in the first coordinate system that is obtained by a laser radar of the first vehicle by scanning an object around the first vehicle;
    obtaining the second point cloud data in the second coordinate system that is obtained by a laser radar of the second vehicle by scanning an object around the second vehicle, wherein the laser radar of the first vehicle and the laser radar of the second vehicle have an overlapping scanning area, and for an obstacle in the overlapping scanning area, the first point cloud data comprises point cloud data corresponding to the obstacle, and the second point cloud data comprises point cloud data corresponding to the obstacle; and calculating the first relative pose based on the point cloud data corresponding to the obstacle in the first point cloud data and the point cloud data corresponding to the obstacle in the second point cloud data.

4. The method according to claim 3, wherein the calculating the first relative pose based on the point cloud data corresponding to the obstacle in the first point cloud data and the point cloud data corresponding to the obstacle in the second point cloud data comprises:

converting the first point cloud data in the first coordinate system to a preset first reference coordinate system of the first vehicle to obtain third point cloud data, wherein the first reference coordinate system is obtained after an origin of the first coordinate system is translated to a preset first reference point;

converting the second point cloud data in the second coordinate system to a preset second reference coordinate system of the second vehicle to obtain fourth point cloud data, wherein the second reference coordinate system is obtained after an origin of the second coordinate system is translated to a preset second reference point; and performing point cloud matching on point cloud data corresponding to the obstacle in the third point cloud data and point cloud data corresponding to the obstacle in the fourth point cloud data to obtain the first relative pose.

5. The method according to claim 4, wherein the performing point cloud matching on point cloud data corresponding to the obstacle in the third point cloud data and point cloud data corresponding to the obstacle in the fourth point cloud data to obtain the first relative pose comprises:

performing N iterations based on the point cloud data corresponding to the obstacle in the third point cloud data and the point cloud data corresponding to the obstacle in the fourth point cloud data to obtain a third transformation matrix that is output by the $N^{th}$ iteration, wherein N is a positive integer; and determining the first relative pose based on the third transformation matrix that is output by the $N^{th}$ iteration, wherein:

for an $i^{th}$ iteration in the N iterations, i is a positive integer not greater than N, and the following operations are performed for each of M points of the obstacle:

performing, based on a third transformation matrix that is output by an $(i-1)^{th}$ iteration, one transformation on point cloud data corresponding to the point in the third point cloud data to obtain transformed point cloud data corresponding to the point, and calculating a difference between the transformed point cloud data corresponding to the point and point cloud data corresponding to the point in the fourth point cloud data to obtain a residual corresponding to the point, wherein M is a positive integer;

calculating a residual sum based on a residual corresponding to each of the M points of the obstacle; and if the residual sum is not less than a preset residual threshold, updating, by using a preset transformation amount, the third transformation matrix that is output by the $(i-1)^{th}$ iteration, and using an updated third transformation matrix that is output by the $(i-1)^{th}$ iteration as a third transformation matrix that is output by the $i^{th}$ iteration to perform a next iteration; or if the residual sum is less than the residual threshold, ending the iteration, and using the third transformation matrix that is output by the $(i-1)^{th}$ iteration as the third transformation matrix that is output by the $N^{th}$ iteration.

6. The method according to claim 5, wherein when i is 1, the third transformation matrix that is output by the $(i-1)^{th}$ iteration is determined based on the following content:

calculating an estimated global pose of the first vehicle at a current moment based on a global pose of the first vehicle at a previous moment and a pose of the first vehicle at the current moment relative to the previous moment that is calculated based on an inertia measurement unit (IMU) by using the global pose of the first vehicle at the previous moment as a reference;

obtaining a global pose of the second vehicle at the current moment based on a global positioning system (GPS) and the IMU;

determining a second relative pose based on the estimated global pose of the first vehicle at the current moment and the global pose of the second vehicle at the current moment, wherein the second relative pose is used to indicate a position and a posture of the help providing object relative to the first vehicle by using the first vehicle as a reference, and the second relative pose is a pose of the help providing object that is determined in the first coordinate system; and using a matrix used to express the second relative pose as the third transformation matrix that is output by the $(i-1)^{th}$ iteration.

7. The method according to claim 6, wherein the determining the first relative pose based on the third transformation matrix that is output by the $N^{th}$ iteration further comprises:

using the third transformation matrix that is output by the $N^{th}$ iteration as a mathematical expression of the first relative pose; or performing weighted fusion on the third transformation matrix that is output by the $(i-1)^{th}$ iteration and the third transformation matrix that is output by the $N^{th}$ iteration to obtain a fourth transformation matrix, and using the fourth transformation matrix as a mathematical expression of the first relative pose.

8. The method according to claim 5, wherein the determining the first relative pose based on the third transformation matrix that is output by the $N^{th}$ iteration further comprises:

using the third transformation matrix that is output by the $N^{th}$ iteration as a mathematical expression of the first relative pose; or performing weighted fusion on the third transformation matrix that is output by the $(i-1)^{th}$ iteration and the third transformation matrix that is output by the $N^{th}$ iteration to obtain a fourth transformation matrix, and using the fourth transformation matrix as a mathematical expression of the first relative pose.

9. A vehicle positioning apparatus, comprising:
at least one processor; and
a non-transitory computer-readable storage medium coupled to the at least one processor and storing programming instructions for execution by the at least one processor, wherein the programming instructions instruct the at least one processor to perform operations comprising:

obtaining a first relative pose between a first vehicle and a help providing object based on first point cloud data in a first coordinate system and second point cloud data in a second coordinate system, wherein the first relative pose is used to indicate a position and a posture of the help providing object relative to the first vehicle by using the first vehicle as a reference, and the first relative pose is a pose of the help providing object that is determined in the first coordinate system;

receiving a global pose of the help providing object, wherein the global pose of the help providing object is determined in the second coordinate system; and calculating a global pose of the first vehicle based on the first relative pose and the global pose of the help providing object.

10. The apparatus according to claim 9, wherein the help providing object comprises a second vehicle, the first relative pose is used to indicate a position and a posture of the second vehicle relative to the first vehicle by using the first vehicle as a reference, and the posture of the second vehicle is used to indicate a vehicle head orientation of the second vehicle by using a vehicle head orientation of the first vehicle as a reference.

11. The apparatus according to claim 10, wherein the programming instructions further instruct the at least one processor to perform:

obtaining the first point cloud data in the first coordinate system that is obtained by a laser radar of the first vehicle by scanning an object around the first vehicle;

obtaining the second point cloud data in the second coordinate system that is obtained by a laser radar of the second vehicle by scanning an object around the second vehicle, wherein the laser radar of the first vehicle and the laser radar of the second vehicle have an overlapping scanning area, and for an obstacle in the overlapping scanning area, the first point cloud data comprises point cloud data corresponding to the obstacle, and the second point cloud data comprises point cloud data corresponding to the obstacle; and calculating the first relative pose based on the point cloud data corresponding to the obstacle in the first point cloud data and the point cloud data corresponding to the obstacle in the second point cloud data.

12. The apparatus according to claim 11, wherein the programming instructions further instruct the at least one processor to perform:

converting the first point cloud data in the first coordinate system to a preset first reference coordinate system of the first vehicle to obtain third point cloud data, wherein the first reference coordinate system is obtained after an origin of the first coordinate system is translated to a preset first reference point;

converting the second point cloud data in the second coordinate system to a preset second reference coordinate system of the second vehicle to obtain fourth point cloud data, wherein the second reference coordinate system is obtained after an origin of the second coordinate system is translated to a preset second reference point; and performing point cloud matching on point cloud data corresponding to the obstacle in the third point cloud data and point cloud data corresponding to the obstacle in the fourth point cloud data to obtain the first relative pose.

13. The apparatus according to claim 12, wherein the programming instructions further instruct the at least one processor to perform:

performing N iterations based on the point cloud data corresponding to the obstacle in the third point cloud data and the point cloud data corresponding to the obstacle in the fourth point cloud data to obtain a third transformation matrix that is output by the $N^{th}$ iteration, wherein N is a positive integer; and determining the first relative pose based on the third transformation matrix that is output by the $N^{th}$ iteration, wherein:

for an $i^{th}$ iteration in the N iterations, i is a positive integer not greater than N, and the following operations are performed for each of M points of the obstacle:

performing, based on a third transformation matrix that is output by an $(i-1)^{th}$ iteration, one transformation on point cloud data corresponding to the point in the third point cloud data to obtain transformed point cloud data corresponding to the point, and calculating a difference between the transformed point cloud data corresponding to the point and point cloud data corresponding to the point in the fourth point cloud data to obtain a residual corresponding to the point, wherein M is a positive integer;

calculating a residual sum based on a residual corresponding to each of the M points of the obstacle; and if the residual sum is not less than a preset residual threshold, updating, by using a preset transformation amount, the third transformation matrix that is output by the $(i-1)^{th}$ iteration, and using an updated third transformation matrix that is output by the $(i-1)^{th}$ iteration as a third transformation matrix that is output by the $i^{th}$ iteration to perform a next iteration; or if the residual sum is less than the residual threshold, ending the iteration, and using the third transformation matrix that is output by the $(i-1)^{th}$ iteration as the third transformation matrix that is output by the $N^{th}$ iteration.

14. The apparatus according to claim 13, wherein the programming instructions further instruct the at least one processor to perform:

when i is 1, determining, based on the following content, the third transformation matrix that is output by the $(i-1)^{th}$ iteration:

calculating an estimated global pose of the first vehicle at a current moment based on a global pose of the first vehicle at a previous moment and a pose of the first vehicle at the current moment relative to the previous moment that is calculated based on an inertia measurement unit (IMU) by using the global pose of the first vehicle at the previous moment as a reference;

obtaining a global pose of the second vehicle at the current moment based on a global positioning system (GPS) and the IMU;

determining a second relative pose based on the estimated global pose of the first vehicle at the current moment and the global pose of the second vehicle at the current moment, wherein the second relative pose is used to indicate a position and a posture of the help providing object relative to the first vehicle by using the first vehicle as a reference, and the second relative pose is a pose of the help providing object that is determined in the first coordinate system; and using a matrix used to express the second relative pose as the third transformation matrix that is output by the $(i-1)^{th}$ iteration.

15. The apparatus according to claim 14, wherein the programming instructions further instruct the at least one processor to perform:

using the third transformation matrix that is output by the $N^{th}$ iteration as a mathematical expression of the first relative pose; or performing weighted fusion on the third transformation matrix that is output by the $(i-1)^{th}$ iteration and the third transformation matrix that is output by the $N^{th}$ iteration to obtain a fourth transformation matrix, and using the fourth transformation matrix as a mathematical expression of the first relative pose.

16. The apparatus according to claim 13, wherein the programming instructions further instruct the at least one processor to perform:

using the third transformation matrix that is output by the $N^{th}$ iteration as a mathematical expression of the first relative pose; or performing weighted fusion on the third transformation matrix that is output by the $(i-1)^{th}$ iteration and the third transformation matrix that is output by the $N^{th}$ iteration to obtain a fourth transformation matrix, and using the fourth transformation matrix as a mathematical expression of the first relative pose.

17. A non-transitory computer-readable storage media comprising instructions which, when executed by one or more processors, cause the one or more processors to perform operations comprising:

obtaining a first relative pose between a first vehicle and a help providing object based on first point cloud data in a first coordinate system and second point cloud data in a second coordinate system, wherein the first relative pose is used to indicate a position and a posture of the help providing object relative to the first vehicle by using the first vehicle as a reference, and the first relative pose is a pose of the help providing object that is determined in the first coordinate system;

receiving a global pose of the help providing object, wherein the global pose of the help providing object is determined in the second coordinate system; and calculating a global pose of the first vehicle based on the first relative pose and the global pose of the help providing object.

18. The non-transitory computer-readable storage media according to claim 17, wherein the help providing object comprises a second vehicle, the first relative pose is used to indicate a position and a posture of the second vehicle relative to the first vehicle by using the first vehicle as a reference, and the posture of the second vehicle is used to indicate a vehicle head orientation of the second vehicle by using a vehicle head orientation of the first vehicle as a reference.

19. The non-transitory computer-readable storage media according to claim 18, wherein the obtaining a first relative pose between a first vehicle and a help providing object comprises:

obtaining the first point cloud data in the first coordinate system that is obtained by a laser radar of the first vehicle by scanning an object around the first vehicle;

obtaining the second point cloud data in the second coordinate system that is obtained by a laser radar of the second vehicle by scanning an object around the second vehicle, wherein the laser radar of the first vehicle and the laser radar of the second vehicle have an overlapping scanning area, and for an obstacle in the overlapping scanning area, the first point cloud data comprises point cloud data corresponding to the obstacle, and the second point cloud data comprises point cloud data corresponding to the obstacle; and calculating the first relative pose based on the point cloud data corresponding to the obstacle in the first point cloud data and the point cloud data corresponding to the obstacle in the second point cloud data.

20. The non-transitory computer-readable storage media according to claim 19, wherein the calculating the first relative pose based on the point cloud data corresponding to the obstacle in the first point cloud data and the point cloud data corresponding to the obstacle in the second point cloud data comprises:

converting the first point cloud data in the first coordinate system to a preset first reference coordinate system of the first vehicle to obtain third point cloud data, wherein the first reference coordinate system is obtained after an origin of the first coordinate system is translated to a preset first reference point;

converting the second point cloud data in the second coordinate system to a preset second reference coordinate system of the second vehicle to obtain fourth point cloud data, wherein the second reference coordinate system is obtained after an origin of the second coordinate system is translated to a preset second reference point; and performing point cloud matching on point cloud data corresponding to the obstacle in the third point cloud data and point cloud data corresponding to the obstacle in the fourth point cloud data to obtain the first relative pose.

* * * * *

UNITED STATES PATENT AND TRADEMARK OFFICE
CERTIFICATE OF CORRECTION

PATENT NO. : 12,252,137 B2
APPLICATION NO. : 17/864998
DATED : March 18, 2025
INVENTOR(S) : Yangjie Pan et al.

Page 1 of 1

It is certified that error appears in the above-identified patent and that said Letters Patent is hereby corrected as shown below:

In the Claims

In Column 31, In Line 46, In Claim 5, delete "Nis" and insert -- N is --.

Signed and Sealed this
Twenty-second Day of July, 2025

Coke Morgan Stewart
*Acting Director of the United States Patent and Trademark Office*